US012601430B2

(12) United States Patent
Miller et al.

(10) Patent No.:  US 12,601,430 B2
(45) **Date of Patent:  \*Apr. 14, 2026**

(54) SHOWER COLUMN ASSEMBLY

(71) Applicant: Kohler Co., Kohler, WI (US)

(72) Inventors: Brandon H. Miller, Sheboygan, WI (US); Liam J. MacGillivray, Palatine, IL (US); Jack E. Davies, Sheboygan, WI (US)

(73) Assignee: Kohler Co., Kohler, WI (US)

( \* ) Notice: Subject to any disclaimer, the term of this patent is extended or adjusted under 35 U.S.C. 154(b) by 436 days.

This patent is subject to a terminal disclaimer.

(21) Appl. No.: 18/070,176

(22) Filed: Nov. 28, 2022

(65) Prior Publication Data

US 2023/0086368 A1      Mar. 23, 2023

Related U.S. Application Data

(63) Continuation of application No. 16/885,014, filed on May 27, 2020, now Pat. No. 11,511,304.

(60) Provisional application No. 62/858,715, filed on Jun. 7, 2019.

(51) Int. Cl.

| | |
|---|---|
| *F16L 27/04* | (2006.01) |
| *A47K 3/28* | (2006.01) |
| *B05B 1/18* | (2006.01) |
| *B05B 15/654* | (2018.01) |
| *E03C 1/06* | (2006.01) |
| *F16L 27/047* | (2006.01) |

(52) U.S. Cl.
CPC ............... *F16L 27/04* (2013.01); *A47K 3/28* (2013.01); *B05B 1/185* (2013.01); *B05B 15/654* (2018.02); *E03C 1/06* (2013.01); *F16L 27/047* (2013.01)

(58) Field of Classification Search
CPC ...... F16L 27/047; F16L 27/04; B05B 15/654; B05B 1/185; B05B 15/65; E03C 1/06
USPC ......................................... 285/322, 323, 324
See application file for complete search history.

(56) References Cited

U.S. PATENT DOCUMENTS

| | | | |
|---|---|---|---|
| 1,985,502 | A | 12/1934 | Isenberg |
| 2,095,170 | A | 10/1937 | Conklin |
| 2,133,020 | A | 10/1938 | Fehrenbach |
| (Continued) | | | |

FOREIGN PATENT DOCUMENTS

| | | |
|---|---|---|
| CN | 1248183 A | 3/2000 |
| CN | 102679074 A | 9/2012 |
| (Continued) | | |

OTHER PUBLICATIONS

Chinese Office Action on CN Appl. Ser. No. 202010511090.6 dated Sep. 30, 2021 (17 pages).

(Continued)

*Primary Examiner* — David Bochna
(74) *Attorney, Agent, or Firm* — Foley & Lardner LLP

(57) ABSTRACT

A quick-connect system for a plumbing fixture includes an arm attachment, an intermediate fitting, and a collar. A first end of the arm attachment is mountable to a fluid conduit. At least a portion of the arm attachment at a second end of the arm attachment is sized to be received within the intermediate fitting and the collar. The collar is configured to slidably engage with the intermediate fitting and press against the intermediate fitting to deform the intermediate fitting over the second end of the arm attachment.

14 Claims, 17 Drawing Sheets

(56) References Cited

U.S. PATENT DOCUMENTS

| | | | |
|---|---|---|---|
| 2,171,875 | A | 9/1939 | Holden |
| 2,174,653 | A | 10/1939 | Conklin |
| 2,216,149 | A | 10/1940 | Weiss |
| RE21,670 | E | 12/1940 | Conklin |
| 2,276,779 | A | 3/1942 | Isenberg |
| 2,277,562 | A | 3/1942 | Schu |
| 2,556,659 | A * | 6/1951 | Patterson ............... F16L 37/52<br>285/317 |
| 2,784,987 | A * | 3/1957 | Corcoran ............. F16L 37/133<br>285/82 |
| 2,893,644 | A | 7/1959 | Holden |
| 4,397,050 | A | 8/1983 | Davis et al. |
| 4,451,069 | A * | 5/1984 | Melone .............. F16L 37/0842<br>285/86 |
| 4,470,575 | A * | 9/1984 | Stoll ....................... F16L 37/40<br>251/149.6 |
| 4,552,387 | A * | 11/1985 | Schmidt ............... F16L 33/225<br>285/190 |
| 4,926,511 | A | 5/1990 | Coll |
| 4,951,329 | A | 8/1990 | Shaw |
| 5,046,763 | A * | 9/1991 | Martucci .............. F16L 37/133<br>285/322 |
| 5,167,431 | A | 12/1992 | Maifredi |
| 5,275,447 | A * | 1/1994 | McNab ................... F16L 33/22<br>285/423 |
| 5,353,448 | A | 10/1994 | Lee |
| 5,749,552 | A | 5/1998 | Fan |
| 5,853,198 | A * | 12/1998 | Richied ................... F16L 37/05<br>285/55 |
| 5,926,868 | A | 7/1999 | Bjerke |
| 6,415,461 | B1 | 7/2002 | Singer |
| 6,446,278 | B1 | 9/2002 | Lin |
| 6,567,998 | B2 | 5/2003 | D'Ugo |
| 6,594,832 | B2 | 7/2003 | Yang |
| 7,963,567 | B2 * | 6/2011 | Gallardo ................... F16L 5/08<br>285/139.3 |
| 8,205,846 | B2 | 6/2012 | Glunk |
| 8,393,020 | B2 | 3/2013 | Grant |
| 8,573,509 | B2 | 11/2013 | Cole |
| 8,713,725 | B2 | 5/2014 | Alder et al. |
| 8,733,675 | B2 | 5/2014 | Leber |
| 8,851,526 | B2 | 10/2014 | Taylor et al. |
| 8,894,927 | B2 | 11/2014 | Finch |
| 8,919,709 | B2 | 12/2014 | Zhou et al. |
| 9,376,789 | B2 * | 6/2016 | Li ............................ E03C 1/021 |
| 9,410,309 | B2 | 8/2016 | Sharratt et al. |
| 9,677,257 | B2 | 6/2017 | Andersen et al. |
| 10,046,342 | B2 | 8/2018 | Zhang et al. |
| 10,047,890 | B2 | 8/2018 | Li |
| 11,511,304 | B2 * | 11/2022 | Miller ..................... B05B 1/185 |
| 11,788,655 | B2 * | 10/2023 | Verma ..................... F16L 27/04<br>285/261 |
| 11,815,205 | B2 * | 11/2023 | Regener .............. F16L 27/1017 |
| 2004/0217196 | A1 | 11/2004 | Yurek et al. |
| 2005/0127211 | A1 | 6/2005 | Yeiser |
| 2005/0160526 | A1 | 7/2005 | Korn |
| 2005/0193487 | A1 | 9/2005 | Watari |
| 2006/0283336 | A1 | 12/2006 | Eveleigh et al. |
| 2007/0022528 | A1 | 2/2007 | Gilbert |
| 2007/0264075 | A1 | 11/2007 | Panasci et al. |
| 2010/0032943 | A1 | 2/2010 | Li et al. |
| 2010/0125944 | A1 | 5/2010 | Prodzenski |
| 2010/0206962 | A1 * | 8/2010 | Nolte ..................... B05B 15/65<br>239/223 |
| 2013/0269793 | A1 | 10/2013 | Tsai |
| 2013/0320116 | A1 | 12/2013 | Jonte et al. |
| 2015/0328646 | A1 | 11/2015 | Granger |
| 2016/0177552 | A1 | 6/2016 | Wilson |
| 2017/0014849 | A1 | 1/2017 | Gao et al. |
| 2017/0173603 | A1 | 6/2017 | Lin et al. |
| 2017/0191249 | A1 | 7/2017 | Chen et al. |
| 2018/0104707 | A1 | 4/2018 | Lin et al. |
| 2019/0024834 | A1 | 1/2019 | Mao |

FOREIGN PATENT DOCUMENTS

| | | |
|---|---|---|
| CN | 202741288 | 2/2013 |
| CN | 103328733 A | 9/2013 |
| CN | 205444336 U | 8/2016 |
| WO | WO-2008/107103 A1 | 9/2008 |

OTHER PUBLICATIONS

Final Office Action on U.S. Appl. No. 16/885,014 DTD May 13, 2022.

Second Chinese Office Action issued in connection with CN Appl. Ser. No. 202010511090.6 dated May 6, 2022 (17 pages).

CN Office Action on CN Patent Application No. 202010511090.6 dated May 9, 2023.

* cited by examiner

14

300

310

308

312  302

14

306

304

316

321

322

318

320

318

SHOWER COLUMN ASSEMBLY

CROSS-REFERENCE TO RELATED PATENT APPLICATIONS

This application is a continuation of U.S. patent application Ser. No. 16/885,014, filed May 27, 2020, now U.S. Pat. No. 11,511,304, which claims the benefit of and priority to U.S. Provisional Patent Application No. 62/858,715, filed Jun. 7, 2019, the entire disclosures of each of which are hereby incorporated by reference herein.

BACKGROUND

The present disclosure relates generally to plumbing fixtures for a shower enclosure. More specifically, the present disclosure relates to shower column assemblies including a showerhead and a handshower.

SUMMARY

One exemplary embodiment of the present disclosure relates to a quick-connect system for a plumbing fixture. The quick-connect system includes an arm attachment, an intermediate fitting, and a collar. A first end of the arm attachment is mountable to a fluid conduit. At least a portion of the arm attachment at a second end of the arm attachment is sized to be received within the intermediate fitting and the collar. The collar is configured to slidably engage with the intermediate fitting and press against the intermediate fitting to deform the intermediate fitting over the second end of the arm attachment.

Another exemplary embodiment of the present disclosure relates to a quick-connect system for a plumbing fixture. The quick-connect system includes an arm attachment, an intermediate fitting, and a collar. A first end of the arm attachment is mountable to a fluid conduit. At least a portion of the arm attachment at a second end of the arm attachment is disposed within the intermediate fitting and the collar. The collar is slidably engaged with the intermediate fitting and holds the intermediate fitting against the portion.

Yet another exemplary embodiment of the present disclosure relates to a shower column assembly. The shower column assembly includes a shower rail and a quick-connect system. The quick connect system includes an arm attachment, an intermediate fitting, and a collar. The intermediate fitting is coupled to the shower rail and extends away from the shower rail in a substantially radial direction. At least a portion of the arm attachment is disposed within the intermediate fitting and the collar. The collar is slidably engaged with the intermediate fitting and holds the intermediate fitting against the portion.

DETAILED DESCRIPTION

Figure 2:
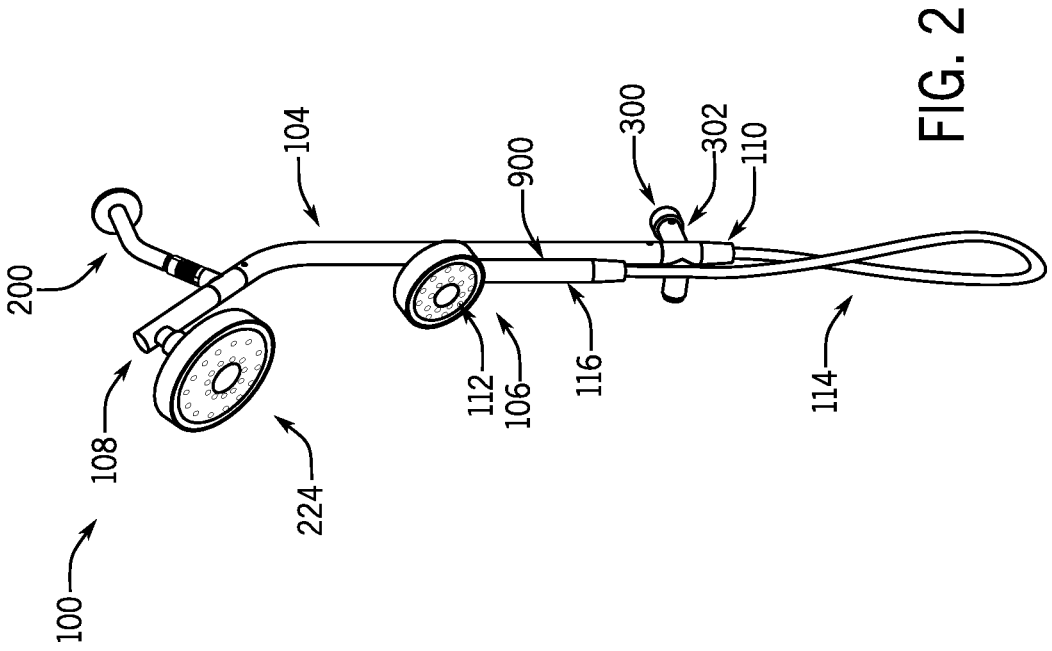
FIG. 2 is a perspective view of a shower column assembly separated from a shower enclosure, according to an exemplary embodiment.

Commercial and residential shower column assemblies exist that allow a user to select between multiple modes of operation. These column assemblies are attached to a shower arm within the shower enclosure and receive water from the shower arm. A user of the column assembly may select whether water is distributed from the shower arm through an upper showerhead, or through a handshower (e.g. a hand sprayer) which may be repositioned to direct water to different areas within a shower enclosure. The column assembly may additionally include a retaining arm or bracket which secures the handshower to the column between uses. The bracket is typically attached to a single location along the column assembly, although adjustable brackets also exist that allow a user to reposition the handshower at different heights along the length of the column. While convenient, existing brackets rely on a friction fit between the bracket and the column assembly to prevent movement of the bracket after positioning. Over a period of time, the bracket may begin to slip toward the bottom of the column. Additionally, these brackets include openings, slots, and other recessed areas that may accumulate dirt, soap residue, and other contaminants during use.

Installation and removal of existing shower column assemblies into the shower enclosure may also be difficult. During installation, the entire column assembly must be lifted into position to thread a fitting onto the shower arm. This operation may require more than one user to help support the weight of the column assembly during installation. Additionally, because the weight of the column assembly is supported at the shower arm, the fitting may loosen over time, resulting in leaks and possible detachment of the column assembly from the shower arm. In order to prevent water leaks, and to reduce the force on the shower arm, some existing shower column assemblies include standoffs which may be directly mounted (e.g., via a single suction cup, bolts, screws, or another threaded fastener) to a wall of the shower enclosure.

Referring generally to the figures, a shower column assembly includes a shower rail, a showerhead, and a handshower. The shower rail is configured to receive water from a shower arm (e.g., a water supply conduit coupled to a commercial or residential water supply line). The shower rail is configured to selectively divert water from the shower arm at least one of the showerhead or the handshower (e.g., to the showerhead independently from the handshower, to the handshower independently from the showerhead, or to a combination of both the handshower and the showerhead).

The shower column assembly additionally includes a quick-connect system that detachably couples the shower rail to the shower arm. The quick-connect system includes a shower arm attachment (e.g., a male coupling), an intermediate fitting (e.g., a female coupling), and a sleeve. A first end of the shower arm attachment is coupled to the shower arm. A second end of the shower arm attachment is received at least partially within the intermediate fitting. The sleeve is slidably engaged with the intermediate fitting and is configured to press against the intermediate fitting to deform the fitting around a second end of the shower arm attachment. Among other benefits, the quick-connect system simplifies installation of the shower column assembly as compared to using threaded fittings alone.

According to an exemplary embodiment, the sleeve is configured receive a sliding input from a user to selectively decouple the shower arm attachment from the intermediate fitting. This functionality enables a single user to easily install or remove the shower column assembly from a shower enclosure without the use of additional tools to manipulate connecting fittings or people to help support the weight of the assembly during installation. In some embodiments, the second end of the shower arm attachment includes a ball-joint to pivotably couple the shower column assembly to the shower arm. The quick-connect system may also be used to couple other components to the shower arm in addition to the assembly. For example, the second end of the shower arm attachment may form a convenient and easy-to-use universal outlet to showerheads, shower rain cans, handshowers, or another plumbing fixture for the shower enclosure.

According to another exemplary embodiment, the shower column assembly includes a T-junction fitting coupled to the intermediate fitting. The T-junction fitting is configured to direct water from the second end of the shower arm attachment to at least one of the showerhead or the handshower (e.g., one or both of the showerhead and the handshower). The T-junction fitting may be received at least partially within a hollow portion of the shower rail to conceal the T-junction fitting and thereby improve the overall aesthetic of the shower column assembly.

According to yet another exemplary embodiment, the shower column assembly includes a magnetic docking system configured to secure the handshower in position relative to the shower rail between uses. The magnetic docking system includes a plurality of magnets disposed within a hollow portion of the shower rail and extending along a length of the shower rail in parallel orientation relative to a central axis of the shower rail. The magnets may be coupled to a support sleeve configured to slidably engage with the hollow portion of the shower rail in order to facilitate assembly of the magnets into the shower rail. The hand sprayer may include a ferritic or magnetic material that interacts with the magnets in the shower rail to couple the hand sprayer to the shower rail. The arrangement of magnets within the shower rail allows the hand sprayer to couple to the shower rail at an infinite number of positions along a length of the shower rail, which advantageously, allows the vertical position of the handshower to be adjusted quickly and easily to accommodate users of different heights. In addition, the magnetic docking system eliminates the need for bulky and difficult to use slide bar and bracket assemblies used to store the hand sprayer in conventional handshower systems.

According to yet another exemplary embodiment, the shower column assembly includes a support system configured to detachably couple the shower column assembly to a wall of the shower enclosure or to another non-porous surface within the shower enclosure. The support system includes the shower rail, a standoff, and a microsuction pad. A first end of the standoff is coupled to a lower end of the shower rail. The standoff extends outward from the shower rail (e.g., radially outward from a central axis of the shower rail, etc.). A first surface of the microsuction pad is coupled to a second end of the standoff. A second surface of the microsuction pad includes a plurality of microsuction elements configured to detachably couple the standoff to the wall of the shower enclosure. Among other benefits, using a plurality of microsuction elements provides greater adhesion force to the wall as compared to support systems utilizing a single suction cup. The microsuction pad also enables retrofit of existing shower plumbing fixtures (e.g., showerheads, etc.) without requiring holes to be drilled or otherwise formed into a wall of the shower enclosure. Additionally, because the adhesion force associated with a single microsuction element is small relative to suction cups used in conventional systems, the microsuction pad may be easily removed through proper application of force along an edge of the pad. These and other advantageously features with become apparent to those reviewing the present disclosure and figures.

Shower Column Assembly

Figure 1:
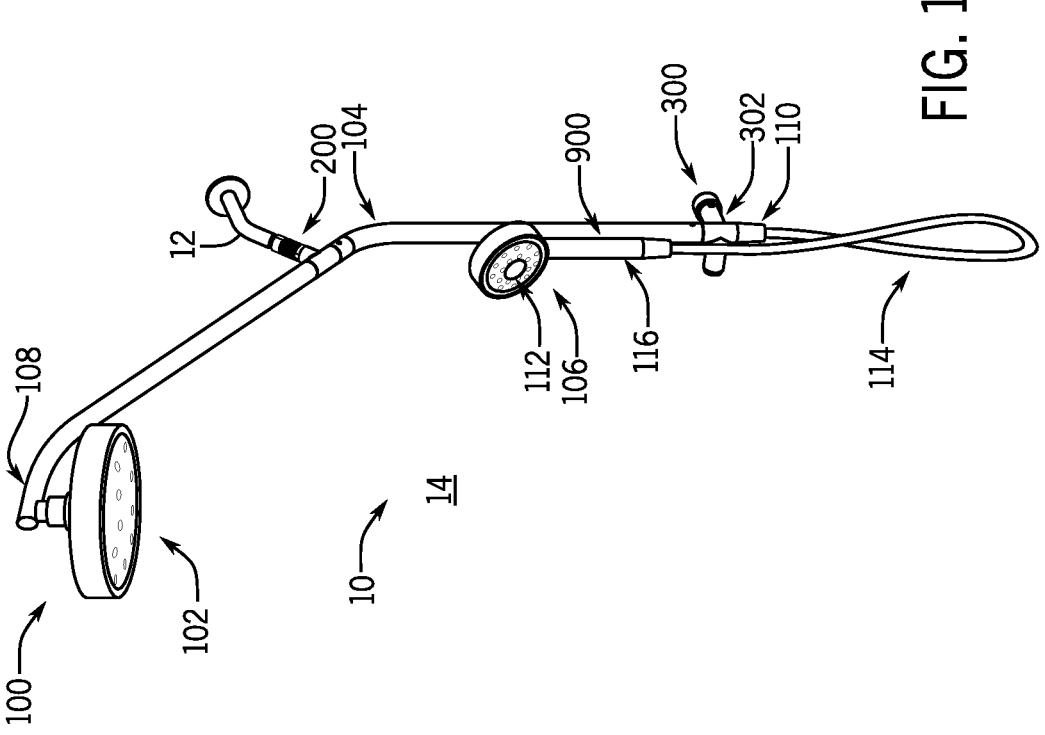
FIG. 1 is a perspective view of a shower column assembly within a shower enclosure, according to an exemplary embodiment.

Referring to FIGS. 1-2, two different types of shower column assemblies are shown, according to an exemplary embodiment. For simplicity, similar numbering for each of these shower column assemblies 100 has been used to identify similar components. As shown in FIG. 1, the assembly 100 includes a showerhead 102, a shower rail 104, and a handshower 106. FIG. 2 shows a shower column assembly having a different showerhead 224 attachment than the assembly of FIG. 1. As shown in FIGS. 1-2, the shower rail 104 is fluidly coupled to both the showerhead 102 (or showerhead 224) and the handshower 106 and is configured to distribute water to at least one of the showerhead 102 (or showerhead 224) or the handshower 106 (e.g., to the showerhead 102 independently from the handshower 106, to the handshower 106 independently from the showerhead 102, or to both the showerhead 102 and the handshower 106). As shown in FIG. 1, the showerhead 102 is disposed on an upper end 108 of the shower rail 104. The handshower 106 is disposed on a lower end 110 of the shower rail 104 opposite the upper end 108.

As shown in FIGS. 1-2, the handshower 106 includes a hand sprayer 112 and a flexible conduit 114 that fluidly couples the hand sprayer 112 to the lower end 110 of the shower rail 104. Among other benefits, the flexible conduit 114 allows a user to manually manipulate a position of the hand sprayer 112 to different areas within a shower enclosure 10. In the exemplary embodiment of FIG. 1-2, the hand sprayer 112 is magnetically coupled to the shower rail 104 via a magnetic docking system 900 that couples a handle 116 of the hand sprayer 112 to the shower rail 104.

As shown in FIGS. 1-2, the assembly 100 includes a quick-connect system 200 configured to detachably couple (e.g., removably couple, etc.) the shower rail 104 to a water supply conduit, shown as shower arm 12, within the shower enclosure 10. The shower rail 104 is configured to receive water from a first end of the shower arm 12. A second end of the shower arm 12 is coupled to a commercial or residential (e.g., household) water supply line (not shown). As shown in FIG. 1, the shower arm 12 extends through a wall 14 of the shower enclosure 10 just above where a user would stand within the shower enclosure. Among other benefits, the quick-connect system 200 minimizes the complexity associated with installing and uninstalling the assembly 100 within the shower enclosure 10.

The assembly 100 additionally includes a support system 300 configured to detachably couple the assembly 100 to the wall 14 of the shower enclosure 10 (e.g., a substantially vertical wall of the shower enclosure 10 below the shower arm 12). The support system 300 includes the shower rail 104, a plurality of standoffs 302, and a microsuction pad (not shown). As shown in FIGS. 1-2, the assembly 100 includes two standoffs 302 extending radially outward in substantially perpendicular orientation relative to the shower rail 104. A first end of each one of the standoffs 302 is coupled to the shower rail 104. A second end of each one of the standoffs 302 is coupled to the microsuction pad (not shown).

Figures 3, 4:
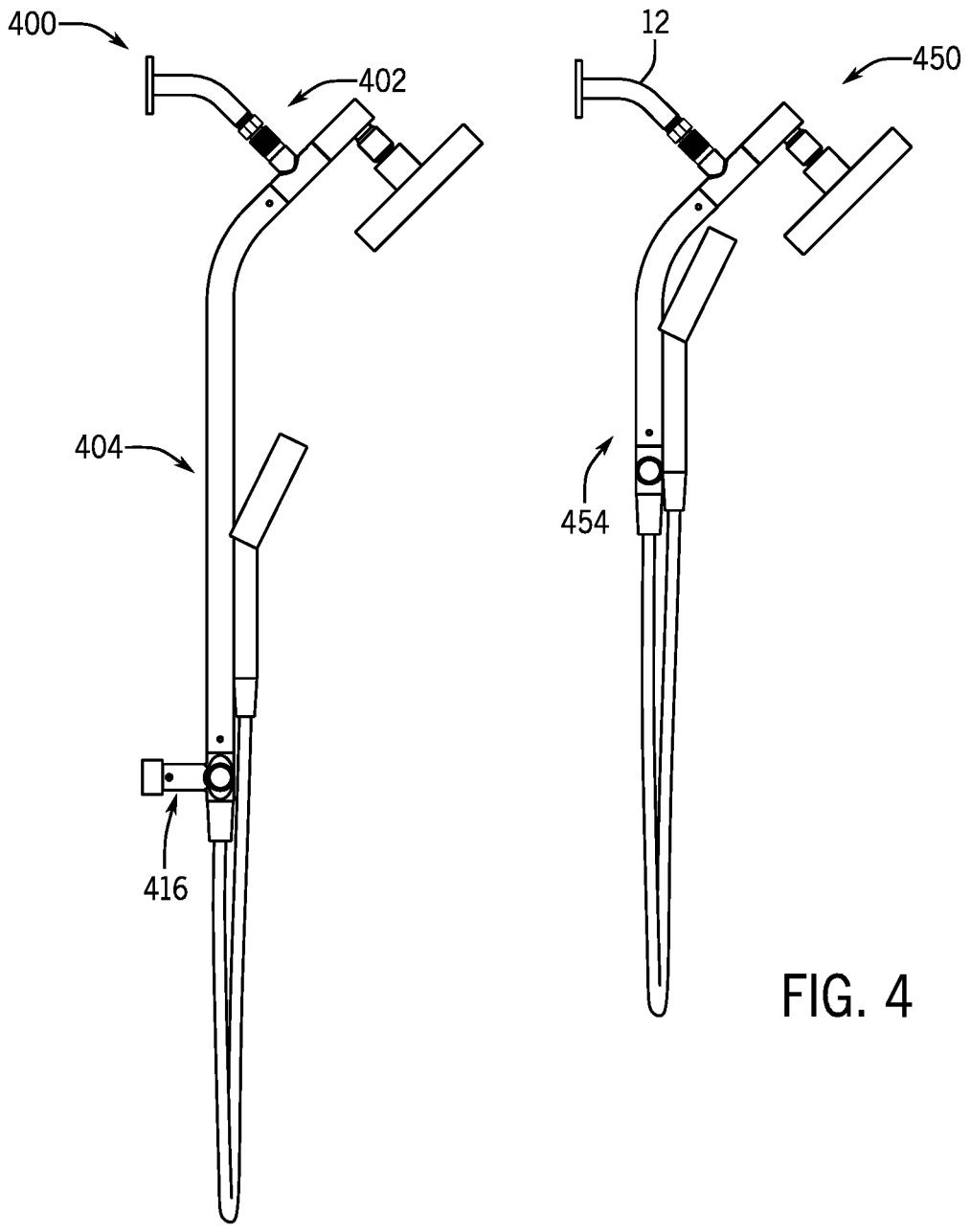
FIGS. 3-4 are side views of shower column assemblies having shower rails of different lengths, according to various exemplary embodiments.

The assembly 100 shown in FIG. 1 is provided for illustrative purposes only. It will be appreciated that the size and arrangement of components used in the assembly 100 may differ in various exemplary embodiments. For example, FIG. 3 shows a shower column assembly 400 including a support system 402 having only a single standoff 416. FIG. 4 shows a shower column assembly 450 including a shower rail 454 with shorter length than the assembly 400 of FIG. 3 (the shower rail 454 of FIG. 4 is approximately half the length of the shower rail 404 of FIG. 3), and where the weight of the assembly 400 is supported entirely by the shower arm 12. The size, type, and arrangement of both the showerhead and the handshower of the assembly 400 of FIG. 3 and the assembly 450 of FIG. 4 are also different from the assembly 100 shown in FIG. 1. The shape of the showerhead and/or handshower may also differ in various exemplary embodiments (e.g., a face of the showerhead may be generally rectangular, circular, or another suitable shape).

In some embodiments, the showerhead includes a plurality of nozzles positioned to distribute water uniformly in a rainfall pattern (e.g., droplets), as multiple pressurized jets, as a continuous or pulsating stream, or in another flow configuration. Alternatively, or in combination, at least one of the showerhead or the handshower may be configured to provide different flow patterns through multiple sets of nozzles. In some embodiments, the flow patterns through the showerhead and/or the handshower may be adjustable. For example, in a first operating mode, the showerhead and/or handshower may be configured to distribute water from a first plurality of nozzles or a single nozzle as an aerated jet. In a second operating mode, the showerhead and/or handshower may be configured to distribute water through a second plurality of nozzles configured to provide a pulsating flow of water to provide a message effect to a user. In a third operating mode, the showerhead and/or handshower may be configured to distribute water through a third plurality of nozzles having a wider spray pattern in order to more fully cover a user's body.

Figure 5:
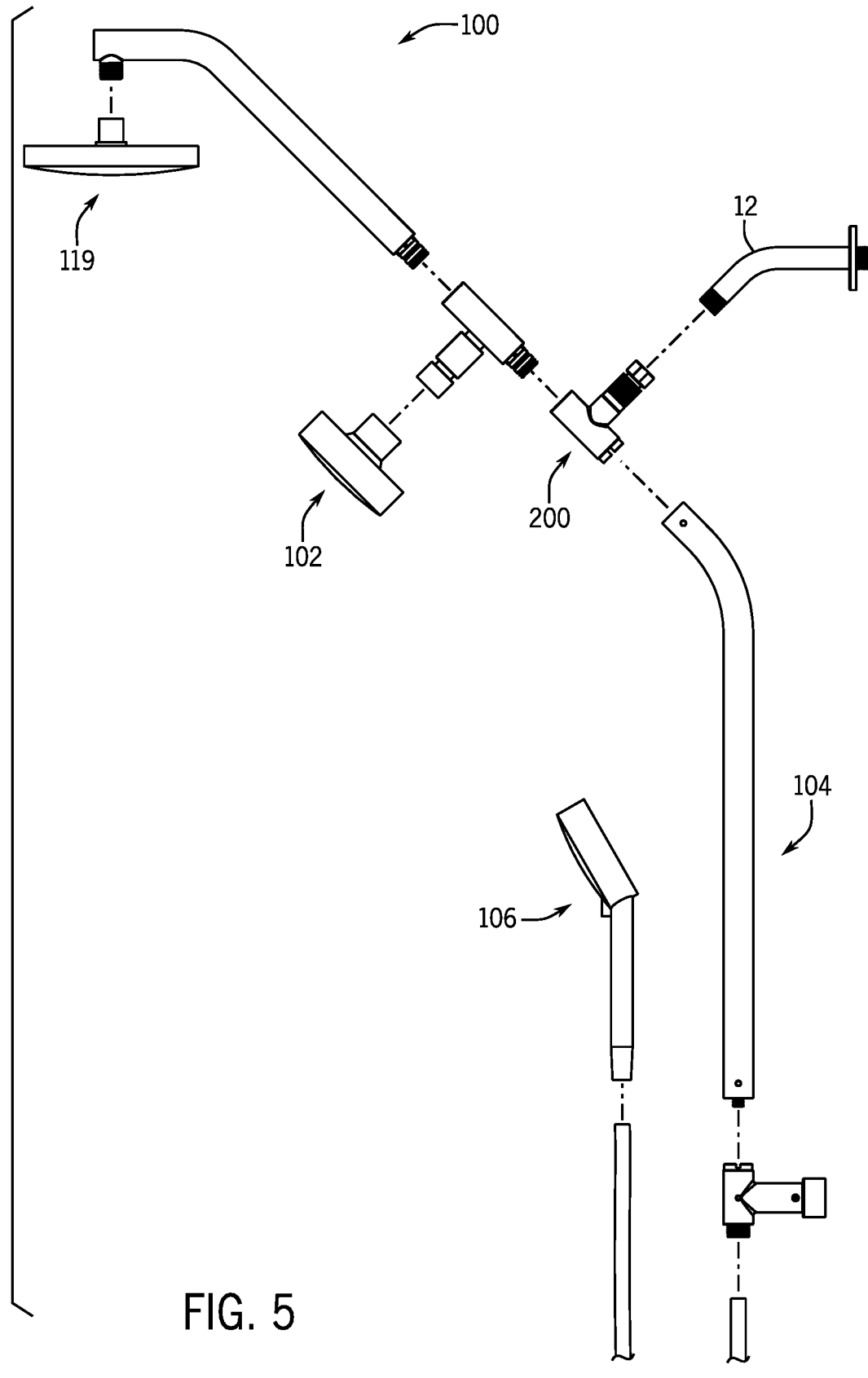
FIG. 5 is an exploded view of a shower column assembly, according to an exemplary embodiment.

Referring to FIG. 5, an exploded view of a shower column assembly is shown, according to an exemplary embodiment. The shower column assembly may be the same or similar to the assembly 100 described with reference to FIG. 1. For simplicity, similar numbering is used to identify similar components. As shown in FIG. 5, the assembly 100 is substantially modular and includes multiple optional components that may be removed or added to the assembly depending on application requirements. For example, as shown in FIG. 5, the assembly 100 may be adapted to include a rain can 119 either alone or in combination with a showerhead 102. Different shower rails 104 shapes and/or handshowers 106 attachments may also be used in different embodiments. Connections between these optional components may be facilitated by the use of universal fittings that are similar to those used for both the main shower arm 12 connection and for connections between optional components of the shower column assembly 100. In other embodiments, different fitting-types may be used. Among other benefits, using a modular assembly 100 allows for greater flexibility between different applications and reduces overall manufacturing costs.

Quick-Connect System

Figure 6:
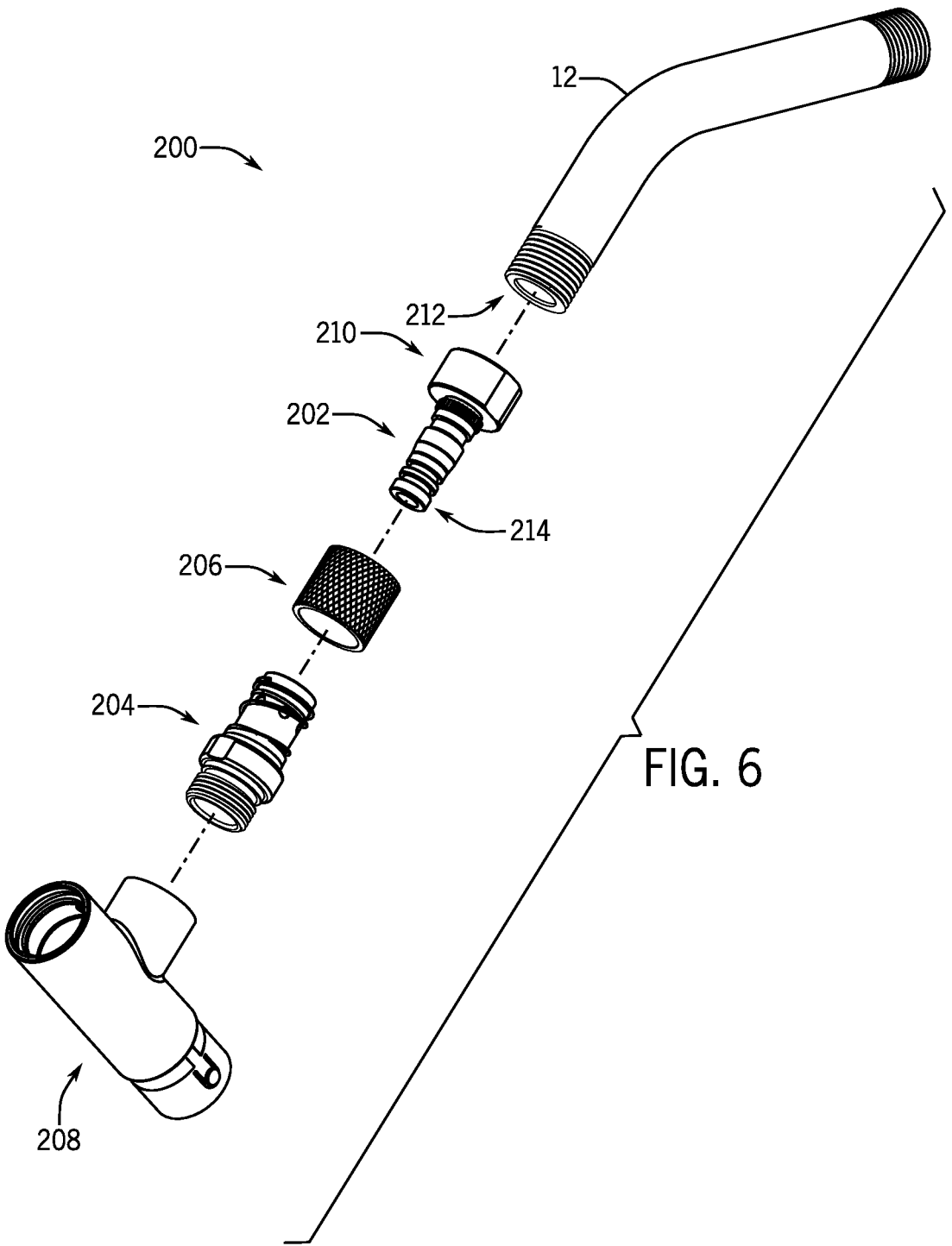
FIG. 6 is an exploded view of a quick-connect system for a shower column assembly, according to an exemplary embodiment.

FIG. 6 shows an exploded view of the quick-connect system 200 of the assembly 100 of FIG. 5. The quick-connect system 200 is configured to detachably (e.g., removably) couple a shower plumbing fixture to the shower arm 12. As shown in FIG. 5, the quick-connect system 200 is configured to detachably couple a shower column assembly 100 to the shower arm 12. The quick-connect system 200 is a separate structure from the shower rail 104 and is coupled to the shower rail 104. In other embodiments, the quick-connect system 200 is at least partially integrally formed with the shower rail 104 or another portion of the assembly 100 as a single unitary body. For example, FIGS. 7-8 show an exemplary embodiments of a quick-connect system 250 that is at least partially integrally formed with a showerhead coupling (e.g., a fitting configured to receive the showerhead 102).

As shown in FIG. 6, the quick-connect system 200 includes a shower arm attachment 202, an intermediate fitting 204, a sleeve 206, and a T-junction fitting 208. In other embodiments, the quick-connect system 200 may include additional, fewer, and/or different components. As shown in FIG. 6, the T-junction fitting 208 is arranged downstream of the shower arm attachment 202, the intermediate fitting 204, and the sleeve 206. The intermediate fitting 204 is arranged downstream of the shower arm attachment 202. A first portion 210 (e.g., a proximal portion, a water receiving portion, etc.) of the shower arm attachment 202 is configured to be detachably coupled to a distal end 212 of the shower arm 12 (e.g., an end of the shower arm 12 opposite the commercial or residential water supply line, a water ejecting end of the shower arm 12, etc.) to receive water from the shower arm 12. As shown in FIG. 6, the first portion 210 of the shower arm attachment 202 includes a generally cylindrically shaped extension including a recessed area configured to receive the distal end 212 of the shower arm 12 therein. According to an exemplary embodiment, the first portion 210 is threadably coupled to the distal end 212 of the shower arm 12. A second portion 214 (e.g., a distal portion, a water ejecting portion, etc.) of the shower arm attachment 202 includes a male fitting or protrusion extending away from the shower arm 12 in substantially parallel orientation with respect to a central axis of the shower arm attachment 202.

The sleeve 206 can receive a sliding input from a user to couple the shower arm attachment 202 from the shower arm attachment 202. Among other benefits, installation operations may be performed with one hand, thereby allowing a single user to install the shower column assembly 100 to the shower arm 12 without the assistance of another person.

Figure 7:
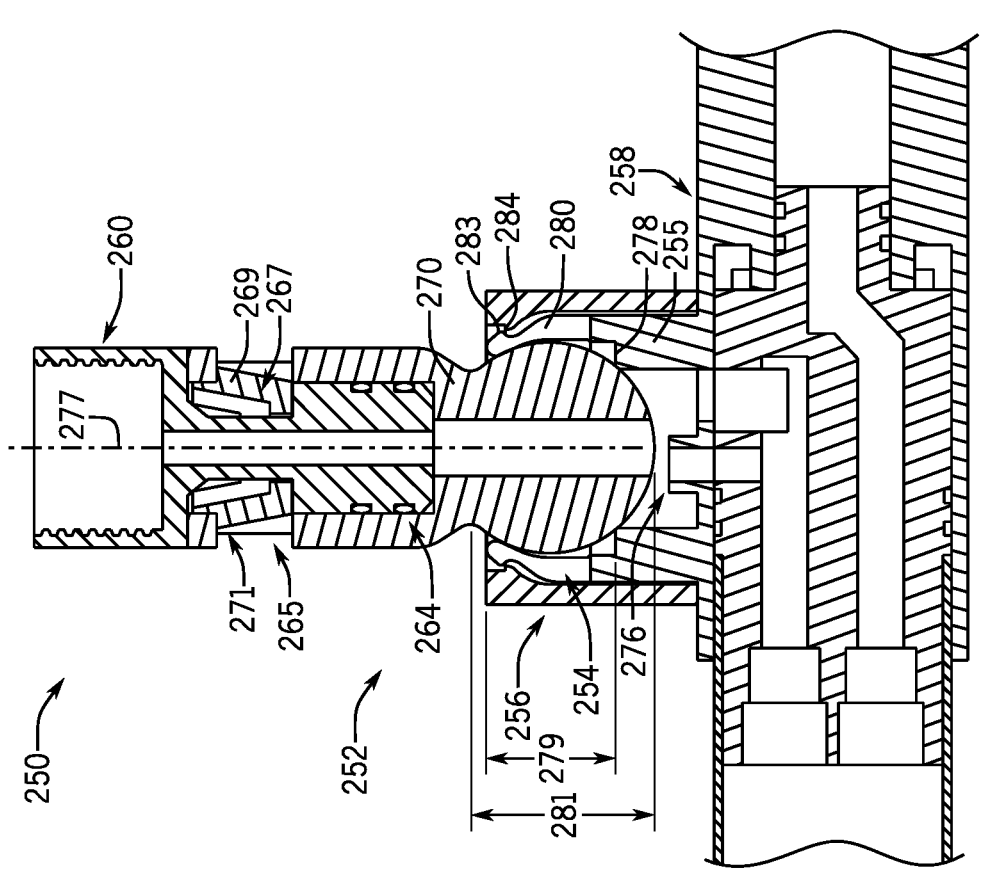
FIG. 7 is a side sectional view of a quick-connect system for a shower column assembly, according to another exemplary embodiment.
Figure 8:
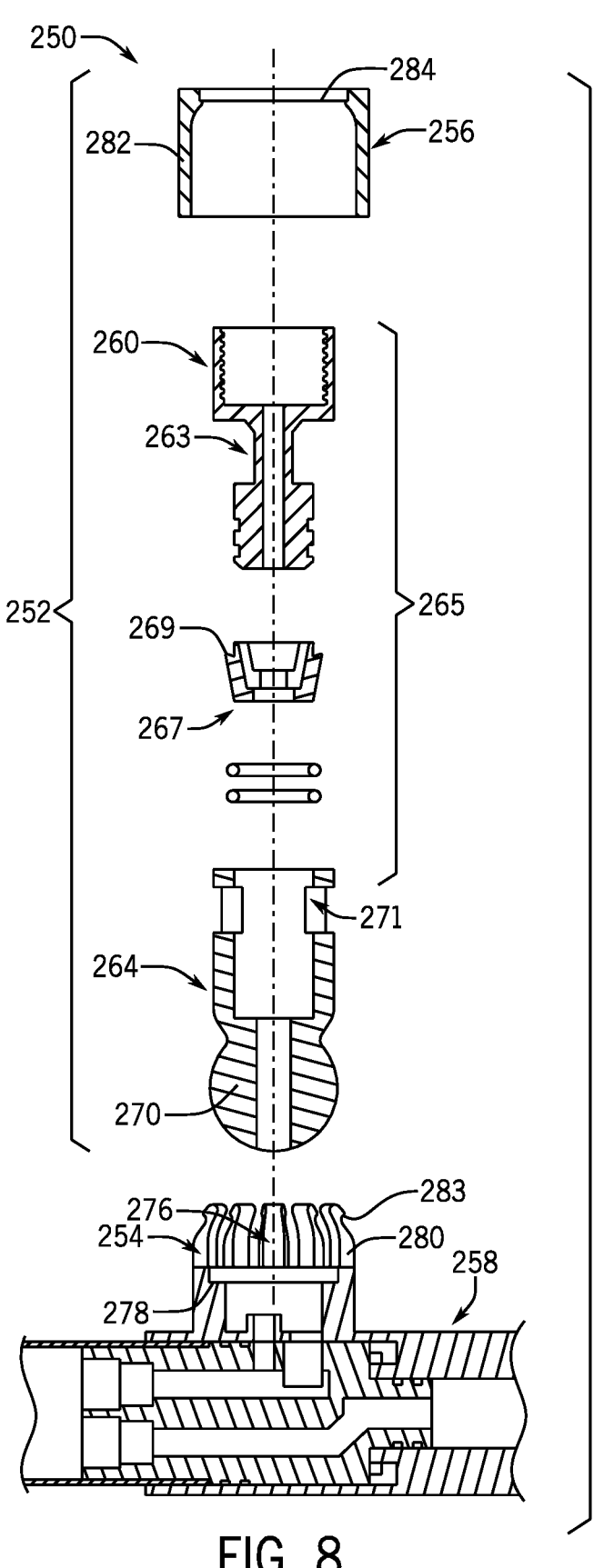
FIG. 8 is an exploded view of the quick-connect fitting of FIG. 7.

Referring to the exemplary embodiment of FIGS. 7-8, another exemplary quick-connect system 250 is shown. The quick-connect system 250 includes a shower arm attachment 252, an intermediate fitting 254, a collar 256, and a T-junction fitting 258. The shower arm attachment 252 includes a quick-connect subassembly 265 configured to detachably couple a first portion 260 of the shower arm attachment 252 to a second portion 264 of the shower arm attachment 252. As shown in FIGS. 7-8, the quick-connect subassembly 265 includes a flexible or deformable retaining clip 267 including a pair of locking tabs 269. The first portion 260 includes a recessed region or slot 263 configured to receive the retaining clip 267 therein. In an installed position, as shown in FIG. 7, the locking tabs 269 engage with an aperture 271 extending through the second portion 264 in substantially perpendicular orientation relative to a central axis of the shower arm attachment 252. To decouple the first portion 260 from the second portion 264, the user simply depresses the locking tabs 269 inwardly toward the first portion 260 to disengage the retaining clip 267 from the aperture 271. The user may utilize a tool (e.g., a screwdriver, a spring clip, etc.) to press against an outer surface of the locking tabs 269 to facilitate this disassembly operation. In other exemplary embodiments, the first portion 260 may be integrally formed with the second portion 264 as a single unitary structure.

As shown in FIGS. 7-8, the second portion 264 of the shower arm attachment 252 includes a ball-joint 270 configured to pivotably couple a shower column assembly, such as shower column assembly 100 of FIG. 1, to a shower arm (e.g., shower arm 12). Among other benefits, using a ball-joint 270 allows the position of a showerhead of the shower column assembly to be adjusted after installation; for example, to accommodate small misalignments in the shower arm. In other embodiments, the second portion 264 of the shower arm attachment 252 includes a differently shaped joint or coupling member that prevents movement of the showerhead or allows for more limited movement of the showerhead relative to the ball-joint 270.

Together, the intermediate fitting 254 and the collar 256 are configured to couple the shower arm attachment 252 to the T-junction fitting 258. In the embodiment of FIG. 7-8, the collar 256 is fixedly coupled to the shower arm attachment 252 (i.e., the collar 256 is configured to be fully assembled onto the T-junction fitting 258 during manufacturing and before installation into a shower/bath). The intermediate fitting 254 may be formed separately from (e.g., as a separate structure) the T-junction fitting 258. In other embodiments, the intermediate fitting 254 may be at least partially integrally formed with the T-junction fitting 258 as a single unitary structure. In some embodiments, a distal end of the T-junction fitting 258 includes a threaded portion 274 configured to engage with a showerhead, a rain can, or another shower plumbing fixture (see also FIG. 2). As shown in FIGS. 7-8, the T-junction fitting 258 (e.g., the intermediate fitting 254) includes a generally cylindrical protrusion 255 configured engage with the second portion 264 of the shower arm attachment 252. The cylindrical protrusion 255 extends from an outer perimeter of the T-junction fitting 258 in substantially perpendicular orientation relative to the T-junction fitting 258 (e.g., radially outward from a central axis of the T-junction fitting 258, vertically upwards as shown in FIG. 7). The cylindrical protrusion 255 defines a central opening 276 configured to at least partially receive the second portion 264 of the shower arm attachment 252 therein. In other words, the second portion 264 of the shower arm attachment 252 forms a male coupling of the quick-connect system 250 and the intermediate fitting 254 forms a female coupling of the quick-connect system 250 into which the male coupling is received.

According to an exemplary embodiment, the intermediate fitting 254 includes a step 278 (e.g., a step 278 at least partially defined by the cylindrical protrusion 255) configured to slidably engage with an outer surface of the shower arm attachment 252. The step 278 determines a position of the shower arm attachment 202 within the intermediate fitting 254 and allows the intermediate fitting 254 (and, correspondingly, the T-junction fitting 258) to pivot along an outer surface of the ball-joint 270. As shown in FIG. 7, the step 278 is disposed approximately half-way between ends of the intermediate fitting 254. In the exemplary embodiment of FIG. 7, a height 279 of the intermediate fitting 254 above the step 278, parallel to a central axis 277 of the intermediate fitting 254, is slightly less than a height 281 of the ball-joint 270.

As shown in FIG. 8, the intermediate fitting 254 includes a plurality of generally arcuate fingers 280 extending upwardly from the step 278 in an axial direction (e.g., substantially parallel to the central axis 277), between the step 278 and a proximal end of the cylindrical protrusion (e.g., a water receiving end of the cylindrical protrusion). Each one of the fingers 280 is curved such that an inner diameter of the fingers 280 (at the proximal end of the cylindrical protrusion) is less than an inner diameter of the fingers 280 at the step 278. As shown in FIG. 8, when the collar 256 is separated from the intermediate fitting 254 (e.g., when the shower arm attachment 252 is decoupled from the intermediate fitting 254), an inner diameter of each one of the fingers 280 at the proximal end is greater than a maximum outer diameter of the ball-joint 270. In other embodiments, where a ball-joint 270 is not used, an inner diameter of each one of the fingers 280 at the proximal end is greater than a maximum outer diameter at another location along the second portion 264. The fingers 280 may be made from a flexible or deformable material, such as plastic, metal, or the like. In this way, the fingers 280 can be selectively repositioned to retain the ball-joint 270 within the intermediate fitting 254 without damaging the fingers 280.

As shown in FIG. 7, the collar 256 is engaged with the intermediate fitting 254 and presses against the intermediate fitting 254 (e.g., each one of the plurality of fingers 280 at the proximal end of the cylindrical protrusion) to deform the intermediate fitting 254 over the ball-joint 270. As shown in FIG. 8, the collar 256 includes a generally cylindrically shaped hollow tube 282 (e.g., a shroud, etc.). A proximal end of the hollow tube 282 (e.g., an upper end of the hollow tube 282 as shown in FIG. 8) has a smaller inner diameter than a distal end of the hollow tube 282. The inner diameter of the hollow tube 282 transitions gradually between the proximal and distal ends of the hollow tube 282, which, advanta- geously, simplifies assembly of the collar 256 over the intermediate fitting 254 (e.g., the gradual transition in inner diameter prevents the collar 256 from catching on the fingers 280 of the intermediate fitting 254 during assembly).

In an installed position, as shown in FIG. 7, the collar 256 presses against a proximal end of each one of the fingers 280 along an outer diameter of the fingers 280. The collar 256 applies a force to the fingers 280 generally directed toward the central axis of the cylindrical protrusion (e.g., central axis 277), urging the fingers 280 against the outer surface of the ball-joint 270. In other words, the collar 256 locks the fingers 253 in position at a predefined diameter so that they cannot expand to release the ball-joint 270 from the inter- mediate fitting 254.

As shown in FIG. 7-8, each one of the fingers 280 includes a latch 283 extending at least partially radially outward from the fingers 280 at the proximal end of the fingers 280. The fingers 280 are configured to engage with an inner protrusion, shown as ledge 284, of the collar 256, to substantially prevent movement of the collar 256 with respect to the intermediate fitting 254 in an axial direction. As shown in FIG. 7, the ledge 284 is located adjacent to a proximal end of the collar 256 and projects radially inward toward the central axis of the collar 256. Together, the latch 283 of the fingers 280 and the ledge 284 of the collar 256 form a clip that prevents movement of the collar 256 relative to the intermediate fitting 254 in the installed position.

Figure 9:
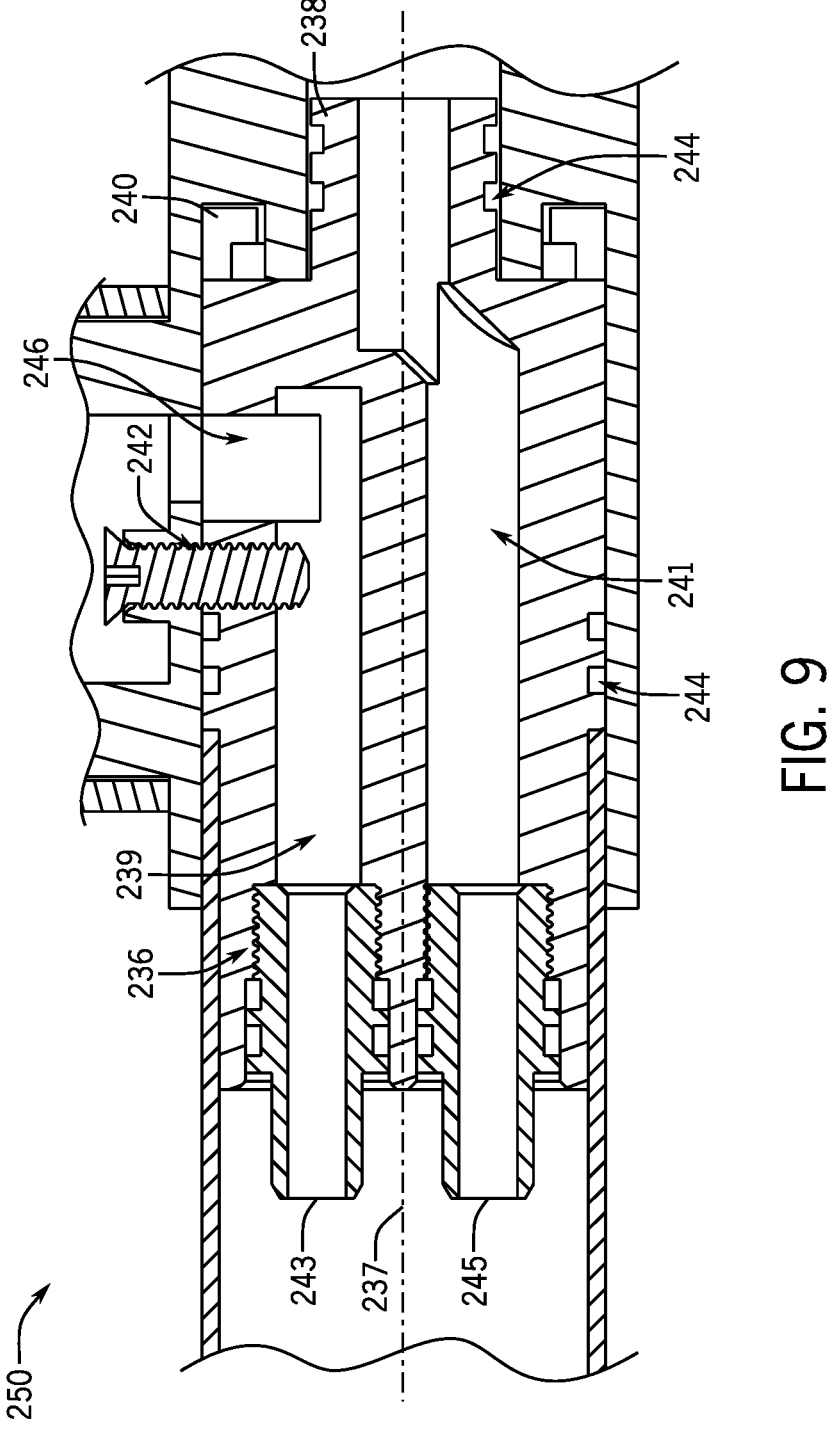
FIG. 9 is a side sectional view of a T-junction diverter insert fitting for a shower column assembly, according to an exemplary embodiment.

As shown in FIG. 9, the shower column assembly (e.g., shower column assembly 100 of FIG. 1) may additionally include a diverter insert 236 configured to direct water to at least one of the showerhead 102 and the handshower 106 (see also FIG. 1). The diverter insert 236 is disposed at least partially within the T-junction fitting 258. In the exemplary embodiment of FIG. 9, the diverter insert 236 includes a post 238 extending from a generally planar surface at a first end of the diverter insert 236 along a central axis 237 of the diverter insert 236. The diverter insert 236 additionally includes a turn lock 240 extending from an outer perimeter of the planar surface. According to an exemplary embodi- ment, the turn lock 240 is a quarter-turn fastener configured to prevent movement of the diverter insert 236 relative to the T-junction fitting 258. As shown in FIG. 9, the diverter insert 236 also includes an opening, shown as locking hole 242, disposed through a side of the diverter insert 236, configured to receive a bolt, screw, or anther fastener therein. Among other benefits, the combination of the quarter turn fastener and the locking hole 242 prevent the diverter insert 236 from separating from the T-junction fitting 258 during use.

The diverter insert 236 includes a plurality of passages, shown as first passage 239 and second passage 241. As shown in FIG. 9, each of the first passage 239 and the second passage 241 extends parallel to a central axis of the diverter insert 236. The second passage 241 is spaced apart from the first passage 239 and is oriented substantially parallel to the first passage 239. In other embodiments, the arrangement of the first passage 239 and the second passage 241 may be different. The first passage 239 is configured to receive water from the shower arm 12 (see also FIG. 1) and to provide water to the handshower 106. The second passage 241 is configured to receive water diverted away from the hand- shower 106 and to provide water to the showerhead 102. As such, flow passes through the first passage 239 and the second passage 241 in opposite directions. According to an exemplary embodiment, an outlet 243 from the first passage 239 and an inlet 245 to the second passage 241 are fluidly coupled to a 3-way connector at a lower end of the shower rail 104 (see FIG. 1). In other embodiments, the diverter insert 236 may be fluidly coupled to another multi-function connector/diverter.

As shown in FIG. 9, the diverter insert 236 further includes a plurality of slots or channels 244 extending in a circumferential direction along an outer surface of the post 238. The channels 244 are sized to receive an O-ring, gasket, or another suitable sealing member. The channels 244 are disposed on either side of an inlet 246 to the first passage 239 in order to prevent water from leaking between an outer surface of the diverter insert 236 and an inner surface of the T-junction fitting 258 (e.g., to prevent water from leaking into a hollow portion of the shower rail 104).

Figures 10, 11:
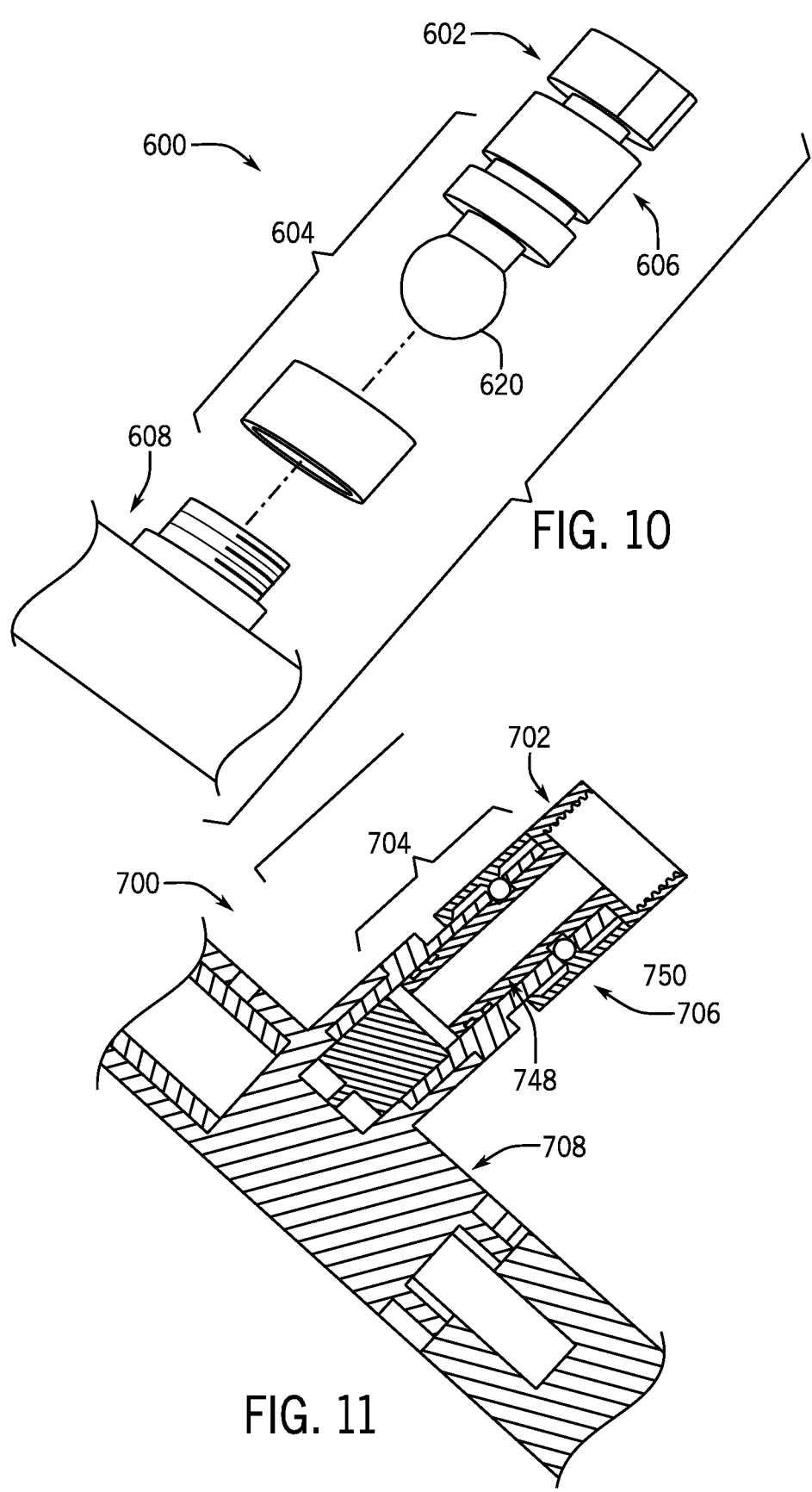
FIG. 10 is an exploded view of a quick-connect fitting for a shower column assembly, according to another exemplary embodiment.
FIG. 11 is a side sectional view of a quick-connect fitting for a shower column assembly, according to another exemplary embodiment.

Referring to FIGS. 10-11, alternative quick-connect sys- tems, shown as system 600 and 700, respectively for a shower plumbing fixture are shown, according to various exemplary embodiments. The system 600 of FIG. 10 and the system 700 of FIG. 11 each include a shower arm attachment 602, 702, an intermediate fitting 604, 704, a sleeve 606, 706, and a T-junction fitting 608, 708. The arrangement of these components may be the same or similar to the arrangement of similar components described with reference to FIG. 6 or FIGS. 7-8. In the exemplary embodiments of FIGS. 10-11, the intermediate fitting 604, 704 is a multi-piece assembly. The intermediate fitting 604, 704 is threadably coupled to the T-junction fitting 608, 708 (e.g., coupled to the T-junc- tion fitting 608, 708 via a threaded connection). In the exemplary embodiment of FIG. 10, a ball-joint 620 is included on the intermediate fitting 604 rather than the shower arm attachment 602. In the exemplary embodiment of FIG. 11, the shower arm attachment 702 includes a straight fitting 748 rather than a ball-joint.

As shown in FIGS. 10-11, the sleeve 606, 706 is slidably engaged to the intermediate fitting 604, 704 and is config- ured to detachably couple the shower arm attachment 602, 702 to the intermediate fitting 604, 704. As shown in FIG. 11, the quick-connect system 700 includes a ball-type safety coupler 750, in which the sleeve 706 presses against a ball bearing or another locking member, which engages with the shower arm attachment 702 to couple the shower arm attachment 702 to the intermediate fitting 704. In other embodiments, another suitable form of hydraulic coupling may be utilized.

Figure 12:
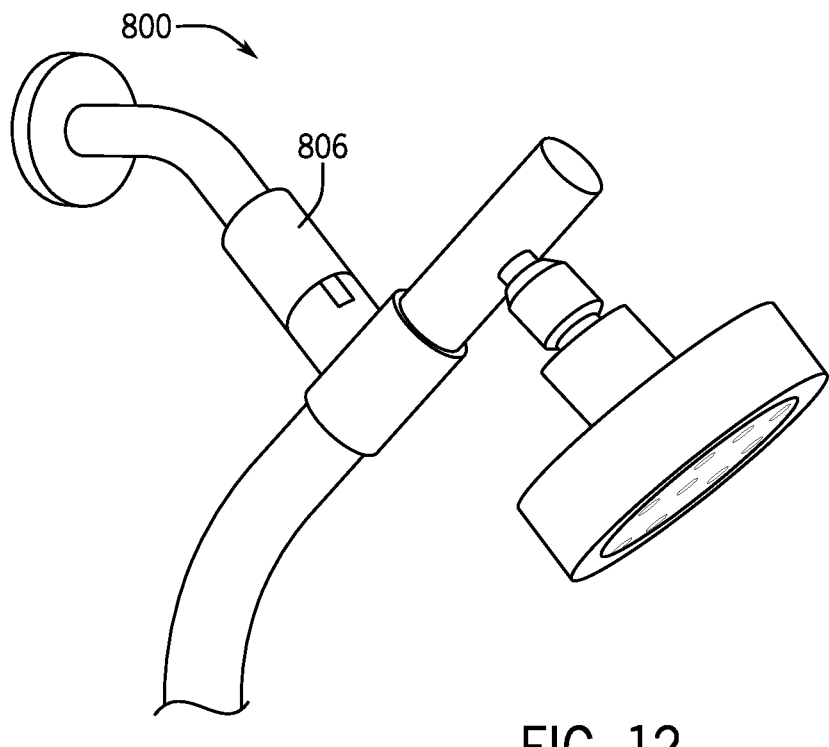
FIGS. 12-13 are perspectives view of a quick-connect system for a shower column assembly, according to another exemplary embodiment.
Figure 13:
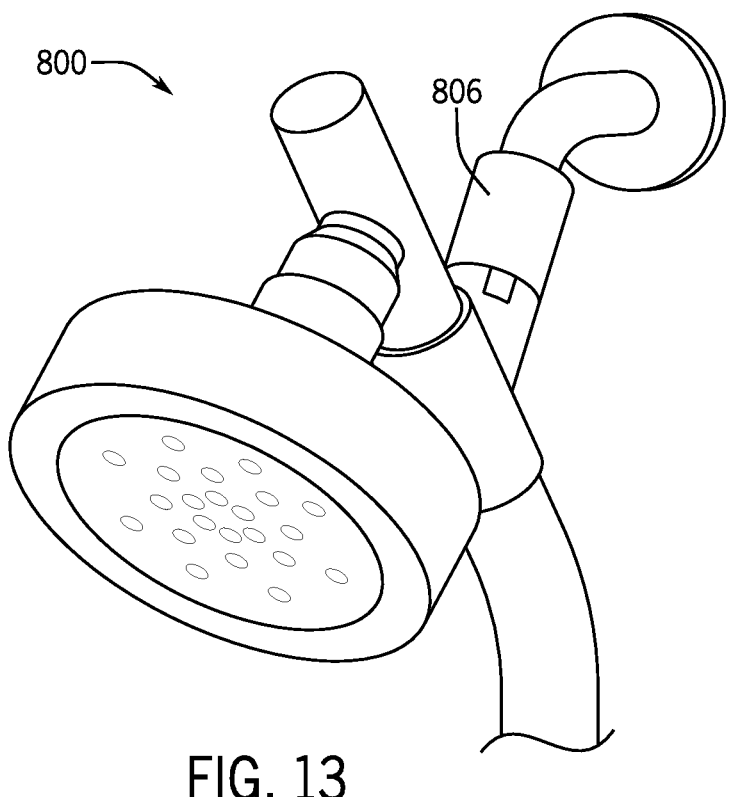

FIGS. 12-13 show an example of another shower column assembly 800 that utilizes a quick-connect system in accor- dance with the various exemplary embodiments described herein. As shown in FIGS. 12-13, the sleeve 806 of the quick-connect system is sized to substantially cover the shower arm attachment and the intermediate fitting to con- ceal the connection and improve the overall aesthetic of the assembly 800. The sleeve 806 also prevents dirt and other contaminants from accumulating in any small gaps formed where the shower arm attachment engages with the intermediate fitting.

Magnetic Docking System

Figure 14:
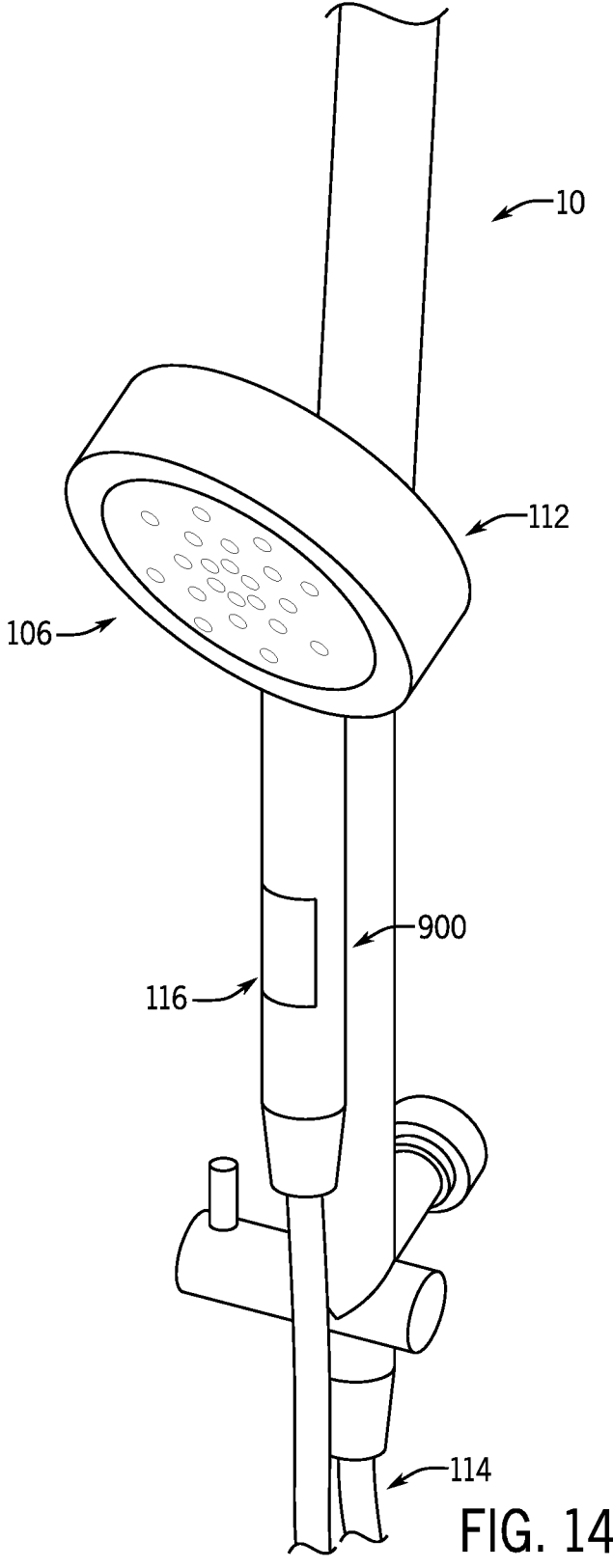
FIG. 14 is a perspective view of a magnetic docking system for a shower column assembly, according to an exemplary embodiment.
Figure 15:
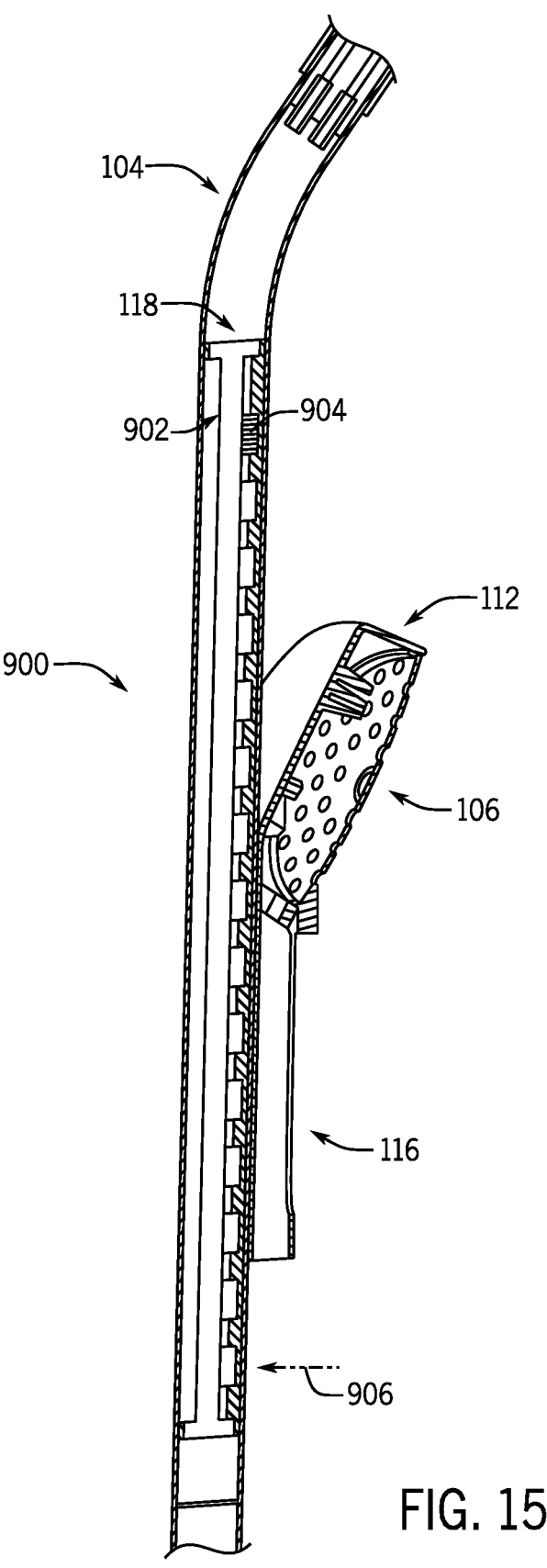
FIG. 15 is a side sectional view of the magnetic docking system of FIG. 14, according to an exemplary embodiment.

FIGS. 14-15 show front and cross-sectional views of the handshower 106 portion of the assembly 100. The handshower 106 includes a hand sprayer 112, which can be manipulated by a user to direct water to different areas within the shower enclosure 10. According to an exemplary embodiment, the assembly 100 includes a magnetic docking system 900 configured to secure the hand sprayer 112 to the shower rail 104 between uses. The magnetic docking system 900 is configured to support the weight of the handshower 106 (e.g., the hand sprayer 112 and at least a portion of the flexible conduit 114).

As shown in FIG. 15, the magnetic docking system 900 includes an inner sleeve 902 and a plurality of magnets 904 disposed on the inner sleeve 902. The inner sleeve 902 is disposed within a hollow portion 118 of the shower rail 104 and extends parallel to a central axis of the shower rail 104. An outer diameter of the inner sleeve 902 may be sized to create an interference condition (e.g., fit) with the shower rail 104 (e.g., a friction fit, etc.). Alternatively, or in combination, the inner sleeve 902 may be coupled to an inner surface 103 of the shower rail 104 using an adhesive product such as glue, epoxy, or the like. In yet other embodiments, another fastening mechanism may be used to couple the inner sleeve 902 to the inner surface 103 of the shower rail 104 (e.g., welding, etc.). The inner sleeve 902 supports the magnets 904 in position within the hollow portion 118 and adjacent to the inner surface 103 of the shower rail 104.

The magnets 904 may be any rare earth magnet known to those of skill in the art. As shown in FIG. 15, each one of the magnets 904 is generally rectangular. A magnetization direction for each one of the magnets 904 is generally radial with respect to the central axis of the shower rail 104 as indicated by the dashed arrow 906. The handle 116 of the hand sprayer 112 includes a ferritic or magnetic material (e.g., a material including iron or another a magnetically permeable material, etc.) configured to magnetically couple the handshower 106 (e.g., hand sprayer 112) to an outer surface of the shower rail 104. The handle 116 may be at least partially made from a ferritic or magnetic material. In other embodiments, the magnetic material may include a permanent magnet.

Figure 16:
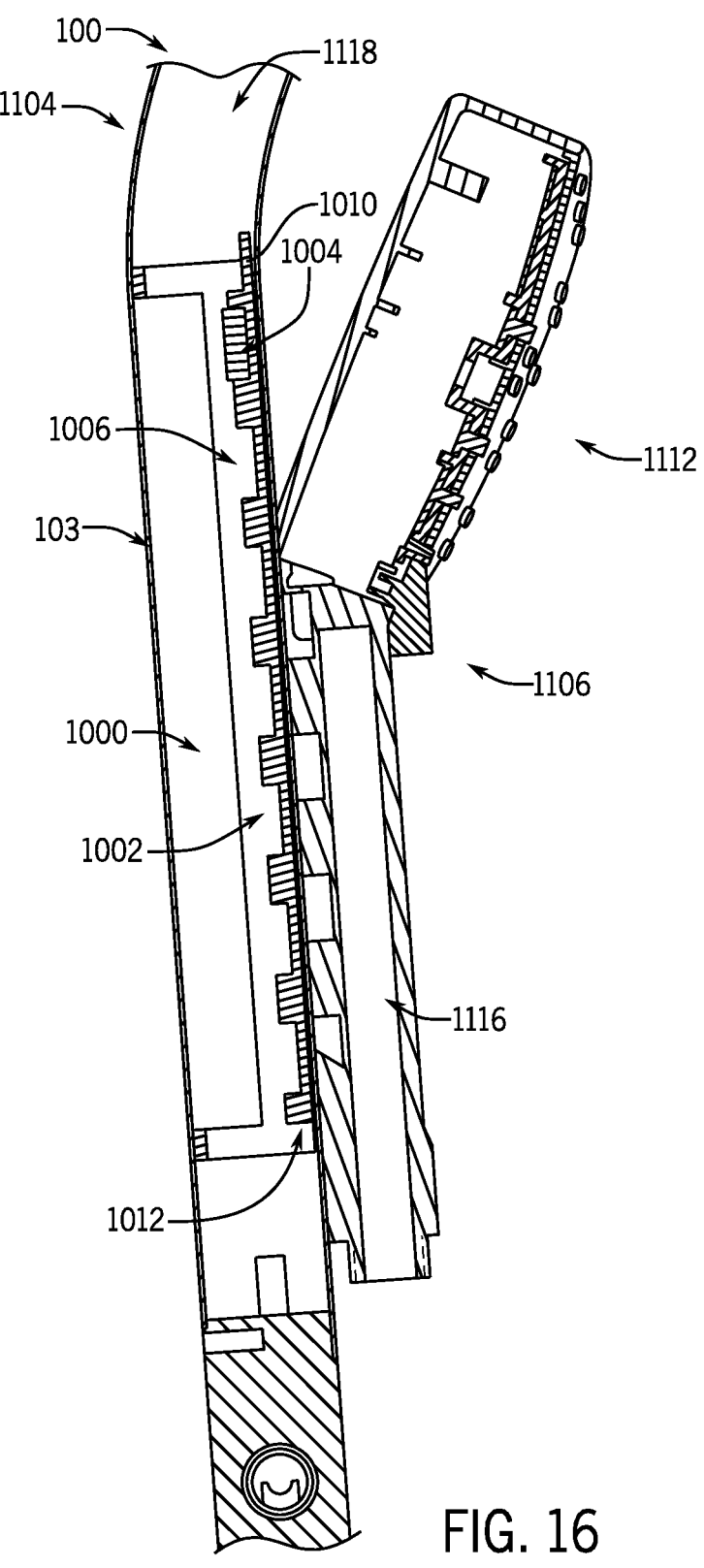
FIG. 16 is a side sectional view of a magnetic docking system for a shower column assembly, according to an exemplary embodiment.
Figure 18:
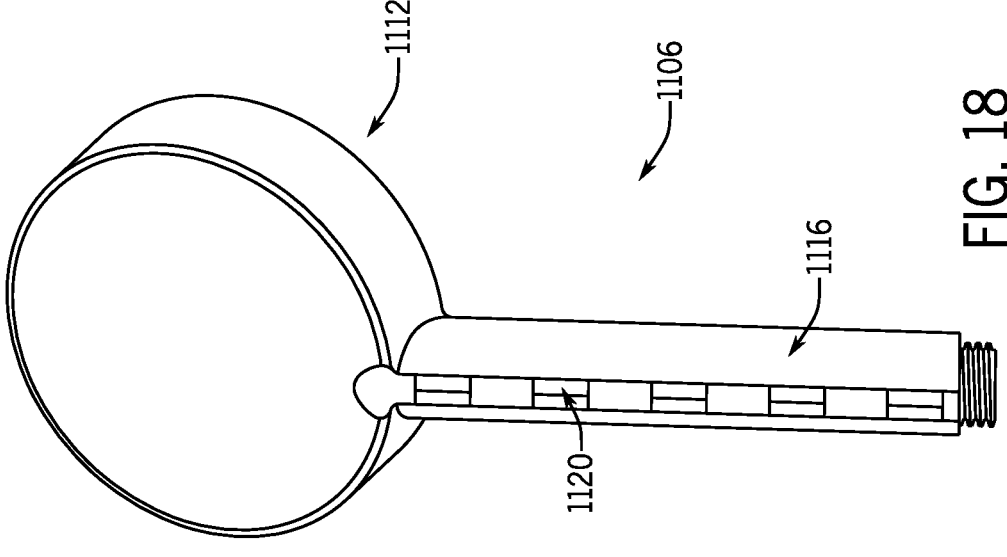
FIG. 18 is a perspective view of a handshower of the magnetic docking system of FIG. 16.
Figure 17:
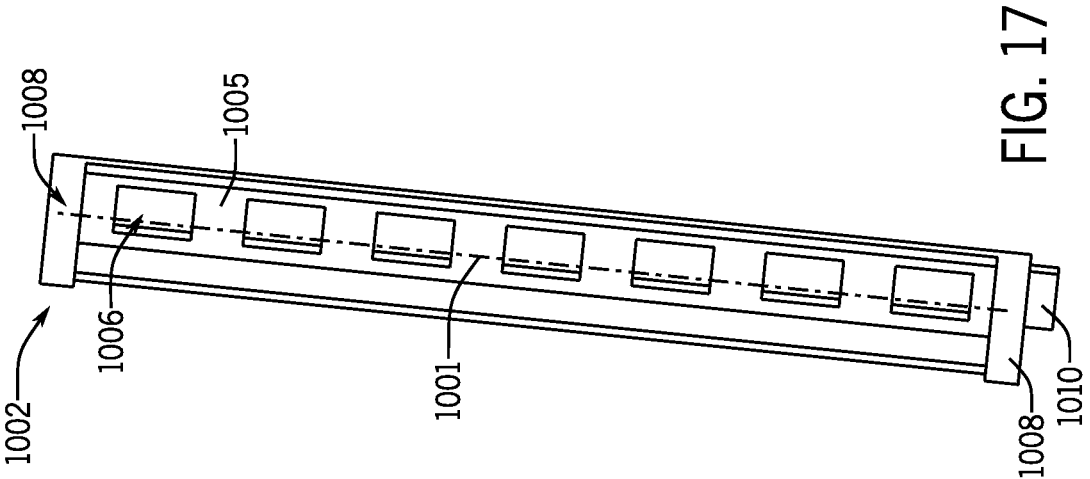
FIG. 17 is a perspective view of a support sleeve for the magnetic docking system of FIG. 16.

Referring to FIGS. 16-18, a magnetic docking system 1000 is provided for a shower column assembly, shown as assembly 1100, according to another exemplary embodiment. The assembly 1100 may be the same or similar to the assembly 100 of FIGS. 1-2. As shown in FIG. 16, a length of a shower rail 1104 for the assembly 1100, parallel to a central axis of the shower rail 1104, is less than a length of the shower rail 104 of FIGS. 14-15. The magnetic docking system 1000 includes an inner sleeve 1002 and a plurality of magnets 1004. As shown in FIGS. 16-17, the inner sleeve 1002 includes a magnet support member 1005 defining a plurality of recessed areas 1006 extending along a length of the inner sleeve 1002 in substantially parallel orientation relative to a central axis 1001 of the inner sleeve 1002 and the shower rail 1104. The recessed areas 1006 are spaced evenly along the length of the inner sleeve 1002. Among other benefits, the distribution of magnets 1004 within the shower rail 1104 allows the hand sprayer 1112 to couple to the shower rail 1104 at a variety of different positions along the length of the shower rail 1104. In other embodiments, one of the shower rail 1104 and the hand sprayer 1112 may include a singular magnet, thereby allowing the hand sprayer 1112 to couple to the shower rail 1104 at an infinite number of positions along the length of the shower rail 1104. In yet other embodiments, the arrangement, number, size, and shape of the magnets within the hand sprayer 1112 or shower rail 1104 may be different.

As shown in FIGS. 16-17, each one of the recessed areas 1006 is sized to receive a corresponding one of the plurality of magnets 1004. The recessed areas 1006 have substantially the same cross-sectional shape as the magnets 1004 in order to prevent movement of the magnets 1004 relative to the inner sleeve 1002. In the exemplary embodiment of FIG. 16, a spacing between each one of the recessed areas 1006, along the length of the inner sleeve 1002, is approximately equal to a length of the magnets 1004 (e.g., a length of the magnets 1004 along the central axis of the inner sleeve 1002). In other embodiments, the spacing between adjacent magnets 1004 may be different.

Figures 19, 20, 21:
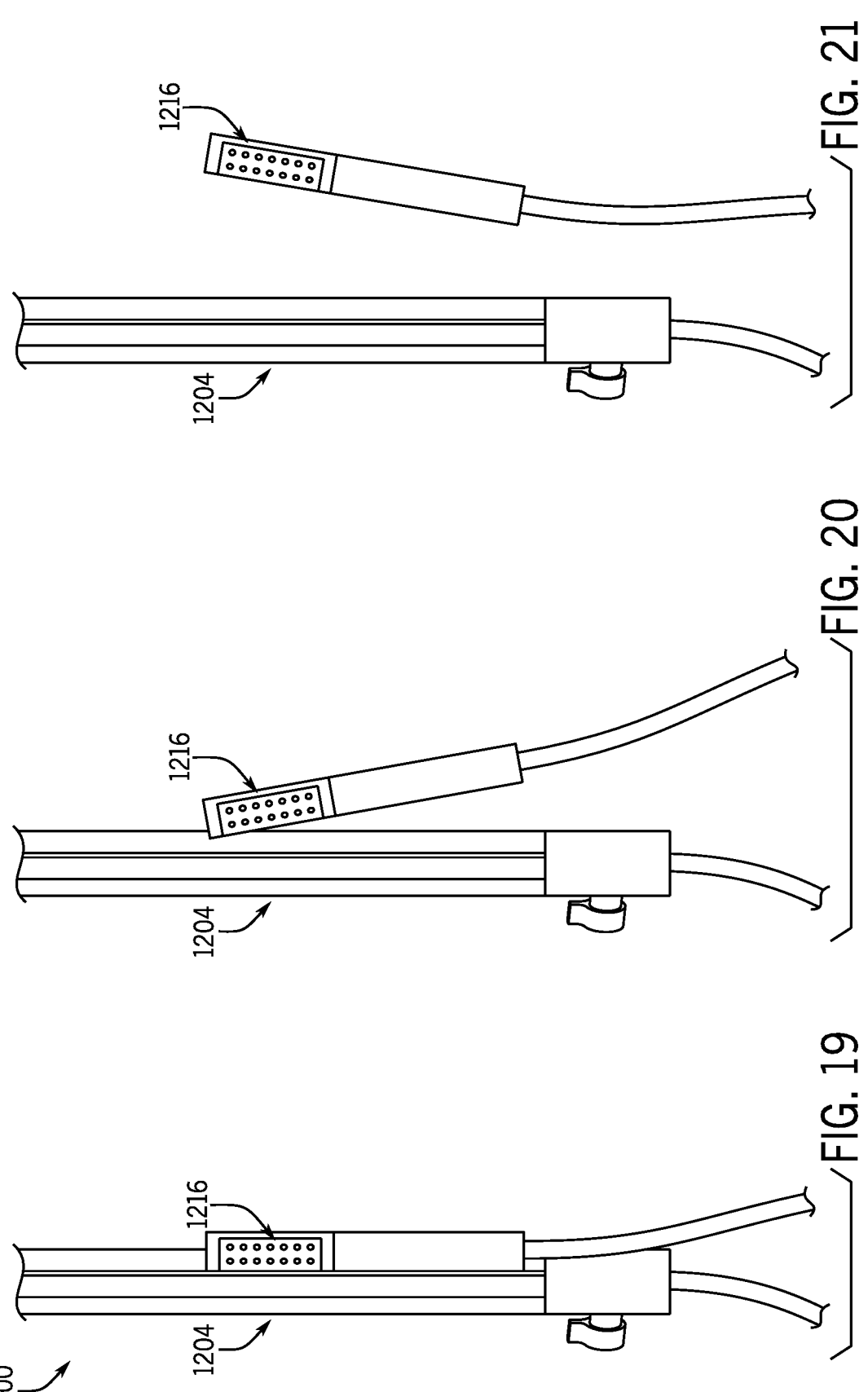
FIGS. 19-21 are front views of a magnetic docking system for a shower column assembly, according to another exemplary embodiment.

As shown in FIGS. 16-17, the inner sleeve 1002 includes a generally cylindrically shaped supporting portion, shown as supporting portion 1008, at either end of the inner sleeve 1002 (e.g., the magnet support member 1005). Among other benefits, the supporting portions 1008 stabilize the inner sleeve 1002 within the hollow portion 1118 of the shower rail 1104 and help position the magnet support member 1005 along an inner surface 103 of the shower rail 1104. As shown in FIG. 16, the inner sleeve 1002 (e.g., the magnet support member 1005) is positioned toward a front part of the inner surface 103 of the shower rail 1104. Alternatively, as shown in FIG. 19, the inner sleeve 1002 may be rotated so that the hand sprayer 1112 may couple to the shower rail 1104 at a different circumferential position along the shower rail 1104. In other embodiments, the inner sleeve 1002 includes multiple magnet support members 1005 extending between the supporting portions 1008 so that a user may select a circumferential position at which the hand sprayer 1112 is coupled to the shower rail 1104.

In some embodiments, the inner sleeve 1002 is configured to engage with other inner sleeves 1002. For example, the inner sleeve 1002 may be configured to engage with another inner sleeve 1002, at an axial end of the inner sleeve 1002 to prevent relative rotation of the inner sleeves 1002, for example, in shower rails of different lengths. As shown in FIG. 16-17, the inner sleeve 1002 includes a tab 1010 extending from a first end of the inner sleeve 1002 and a receiving slot 1012 disposed on a second end of the inner sleeve 1002 (e.g., opposite the first end). The receiving slot 1012 is sized to receive the tab 1010 therein. Among other benefits, the tab 1010 and the receiving slot 1012 ensure alignment is maintained between the magnets 1004 in adjacent inner sleeves 1002 (e.g., along the length of the shower rail 1104).

FIG. 18 shows a handle 1116 of the hand sprayer 1112 of FIG. 16. The handle 1116 includes a plurality of pockets 1120 configured to receive a magnetic material therein. According to an exemplary embodiment, the magnetic material is a rare earth magnet known to those of skill in the art. The pockets 1120 extend in substantially parallel orientation relative to a central axis of the handle 1116. In the exemplary embodiment of FIG. 18, the pockets 1120 are disposed in an outer surface of the handle 1116. In other embodiments, the pockets 1120 may be disposed within the handle 1116 or covered by a shield or shroud to conceal the magnetic material from a user and, thereby improve the overall aesthetic of the handshower 1106. A spacing of the pockets 1120 along the central axis of the handle 1116 may be approximately the same as the spacing of the recessed areas 1006 along the inner sleeve 1002. In other embodiments, the spacing between the pockets 1120 may be different. As shown in FIG. 18, the pockets 1120 are disposed along a back side of the handle 1116. Alternatively, or in combination, the handle 1116 may include additional pockets 1120 at different circumferential positions along the handle 1116. The exact number and arrangement of magnets 1004 may differ in various exemplary embodiments.

Referring to FIGS. 19-21, an undocking operation of a hand sprayer 1216 of a shower column assembly 1200 is generally shown, according to an exemplary embodiment. As shown in FIG. 19, in a docked position (e.g., where the hand sprayer 1216 is coupled to a shower rail 1204 of the assembly 1200), an outer surface of the hand sprayer 1216 is approximately flush with an outer surface of the shower rail 1204. In order to remove (e.g., disengage, undock, etc.) the hand sprayer 1216 from the shower rail 1204, a user applies a force (e.g., pulls) on the hand sprayer 1216 (e.g., applies a force to the handle 1116 away from the shower rail 1204 as shown in FIG. 20). As the hand sprayer 1216 moves away from the shower rail 1204, the force on the hand sprayer 1216 decreases due to the spacing between the magnetic material in the shower rail 1204 and hand sprayer 1216.

Referring to FIGS. 22-25, another magnetic docking system 1300 for a shower column assembly 1400 is shown, according to an exemplary embodiment. The shower column assembly 1400 includes a shower rail 1404 and a hand sprayer 1416. The magnetic docking system 1300 detachably couples (e.g., magnetically couples) the hand sprayer 1416 to a lower portion 1418 (e.g., vertical portion, leg, etc.) of the shower rail 1404, at any position (e.g., any vertical position) along a length of the lower portion 1418. In other embodiments, the magnetic docking system 1300 extends into other portions of the shower rail 1404.

Figures 22, 23:
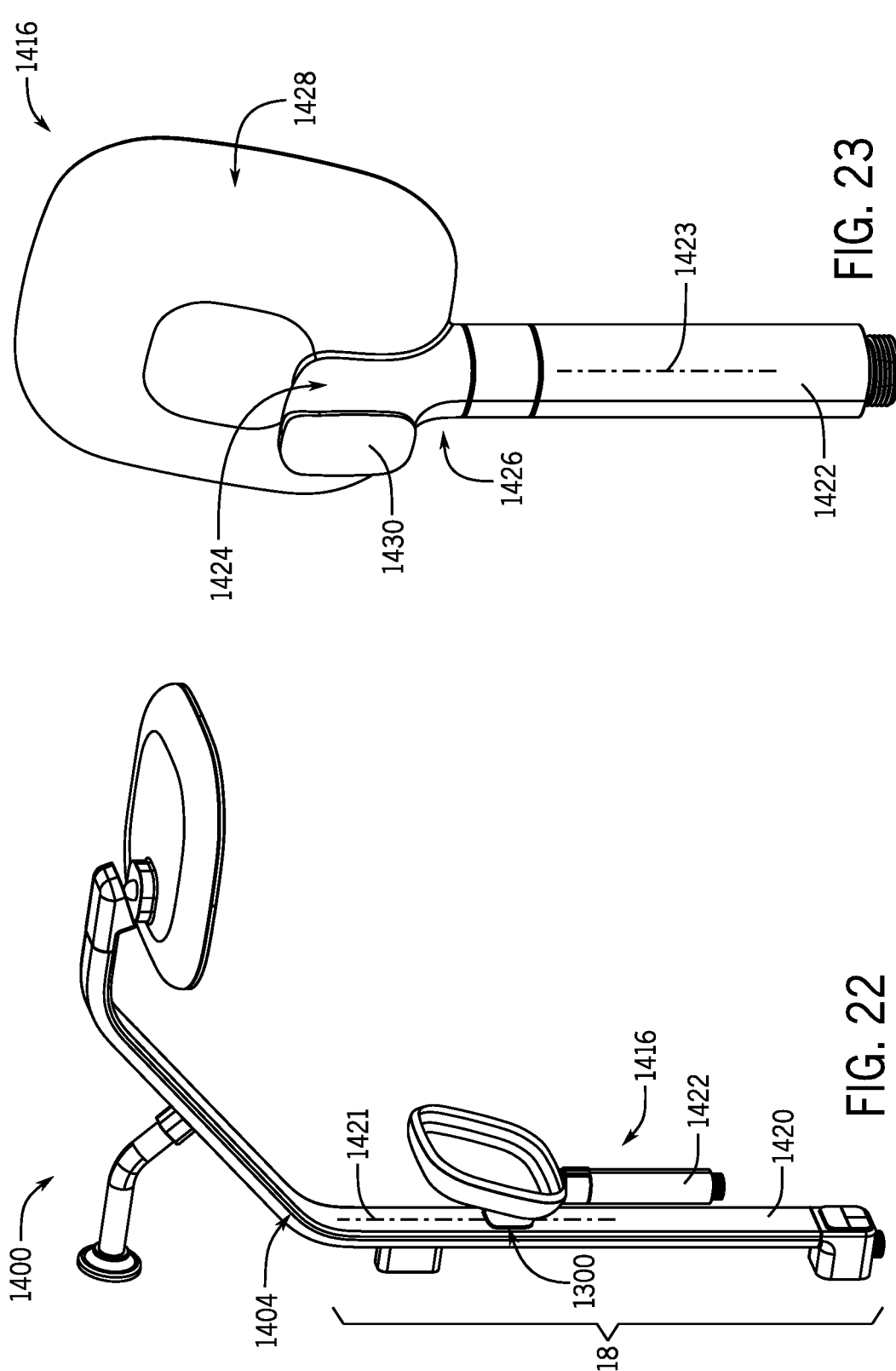
FIG. 22 is a perspective view of a shower column assembly, according to another exemplary embodiment.
FIG. 23 is a rear perspective view of a hand sprayer for the shower column assembly of FIG. 22.

As shown in FIG. 22, a cross-sectional shape of the shower rail 1404 (e.g., lower portion 1418), substantially perpendicular to a longitudinal axis 1421 of the shower rail 1404, is substantially rectangular. In other embodiments, the cross-sectional shape of the shower rail 1404 may be different. As shown in FIG. 22, the hand sprayer 1416 engages (e.g., contacts, etc.) a substantially planar forward surface 1420 (e.g., a forward facing surface opposite a wall facing surface, etc.) of the lower portion 1418 that faces into the shower enclosure (e.g., toward a user, etc.). In this way, the hand sprayer 1416 may continue to direct water toward a user even when mounted to the shower rail 1404. In other embodiments, the hand sprayer 1416 may engage a side surface of the shower rail 1404 or another surface of the shower rail 1404.

The hand sprayer 1416 is magnetically connected to the shower rail 1404 without any other form of mechanical coupling (e.g., without a separate docking element, etc.). As shown in FIG. 23, the hand sprayer 1416 includes a handle 1422 and a coupling member 1424 disposed at an upper end 1426 of a handle 1422. According to an exemplary embodiment, the coupling member 1424 is a protrusion that extends away from a rear surface of the hand sprayer 1416 in substantially perpendicular orientation relative to a central axis 1423 of the handle 1422. In other embodiments, the coupling member 1424 is disposed at a central position along the spray head 1428 of the hand sprayer 1416 or at another position along the spray head 1428 or handle 1422.

In the exemplary embodiment of FIG. 23, the coupling member 1424 is a rectangular-shaped protrusion defining a substantially planar rear surface 1430. The rear surface 1430 is substantially parallel to the central axis 1423 of the handle 1422, which improves stability of the hand sprayer 1416 when docked to the shower rail 1404 (i.e., prevents the hand sprayer 1416 from rocking/rotating and ensures that the flow will be directed inwardly toward the user). In other embodiments, the shape of the coupling member 1424 may be different (e.g., circular, triangular, etc.) and/or may be angled with respect to the central axis 1423 of the handle 1422.

Figures 24, 25:
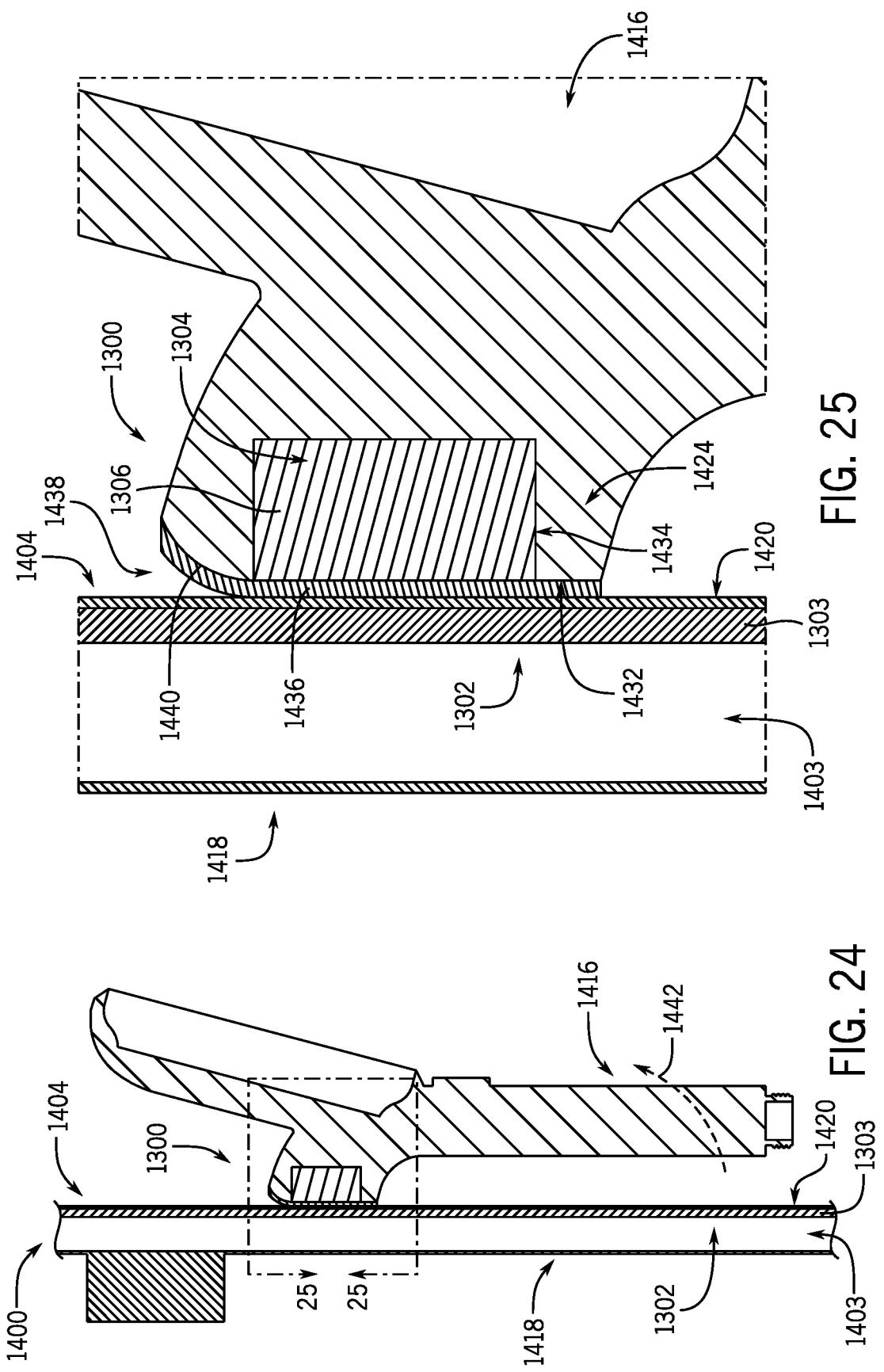
FIG. 24 is a side cross-sectional view of the shower column assembly of FIG. 22.
FIG. 25 is a side cross-sectional view of a magnetic docking portion of the shower column assembly of FIG. 22.

FIGS. 24-25 show cross-sectional views through the magnetic docking system 1300 for the shower column assembly 1400. The magnetic docking system 1300 facilitates quick repositioning of the hand sprayer 1416 to any one of an infinite number of vertical position along the length of the shower rail 1404 (e.g., lower portion 1418). In this way, a user can easily adjust the height of the hand sprayer 1416 to best suit their needs. As shown in FIG. 24, the magnetic docking system 1300 includes a first magnetic subassembly 1302 positioned within a hollow portion 1403 of the shower rail 1404 and extending along the length of the lower portion 1418. In the exemplary embodiment of FIG. 24, the first magnetic subassembly 1302 includes a strip of steel 1303 or another magnetic material. The magnetic material may be welded, adhered, or otherwise fastened to the wall (e.g., interior surface) of the shower rail 1404. In some embodiments, the magnetic material may be integral with the shower rail 1404 (e.g., the walls of the shower rail 1404 may be at least partially made from and/or impregnated with a ferritic or magnetic material such as steel and/or other metal alloys made from iron, nickel, cobalt, etc.). In other embodiments, the magnetic material is a permanent magnet; for example, a strip of ferrite that has a magnetization direction oriented substantially perpendicular relative to the forward surface 1420. Among other benefits, positioning the magnetic material within the shower rail 1404, protects the material from corrosion and prevents a user from damaging the magnetic material. In other embodiments, the magnetic materially may be disposed on an outer (e.g., exterior) surface of the shower rail 1404.

As shown in FIG. 25, the hand sprayer 1416 includes a second magnetic subassembly 1304 that magnetically couples to the first magnetic subassembly 1302. Similar to the first magnetic subassembly 1302, the second magnetic subassembly 1304 includes a ferritic or magnetic material (e.g., a material including iron, nickel, cobalt, or anther sufficiently magnetically permeable material). In the exemplary embodiment of FIG. 25, the second magnetic subassembly 1304 includes a disk shaped permanent magnet 1306 that is disposed within the coupling member 1424 of the hand sprayer 1416 and has a magnetization direction oriented perpendicular to a rear face 1432 of the coupling member 1424. In particular, the permanent magnet 1306 is disposed within a circular-shaped recessed area 1434 (e.g., depression, pocket, slot, etc.) formed into the rear face 1432 of the coupling member 1424 at a central position along the rear face 1432. It will be appreciated that the shape of the permanent magnet 1306 and recessed area 1434 may differ in various exemplary embodiments. For example, the permanent magnet 1306 may be rectangular, triangular, oval, or any other suitable shape. In the exemplary embodiment of FIG. 25, the shape of the recessed area 1434 is complimentary with (e.g., the same as, etc.) the shape of the permanent magnet 1434 to prevent movement of the permanent magnet 1434 relative to the recessed area 1434. However, in other embodiments, the shape of the recessed area 1434 may be different from the shape of the permanent magnet 1434.

The coupling member 1424 also includes a cover 1436 that extends across the rear face 1432 and over the permanent magnet 1306 (e.g., a cover 1436 forming a rear surface 1430 of the coupling member 1424). The cover 1436 may be made from rubber or another soft and durable material to prevent damage to the shower rail 1404. In other embodiments, the second magnetic subassembly 1304 includes a piece of steel or soft magnetic material rather than a permanent magnet that interacts with a permanent magnet in the shower rail 1404. In other embodiments, both the first magnetic subassembly 1302 and the second magnetic subassembly 1304 include permanent magnets.

As shown in FIG. 25, the rear face 1432 of the coupling member 1424 at an upper end 1438 of the rear face 1432 is curved away from the shower rail 1404. Among other benefits, the curved upper surface 1440 of the rear face 1432 facilitates separation of the hand sprayer 1416 from the shower rail 1404. To disengage the hand sprayer 1416, a user may pull on the handle to rotate the handle 1422 upwardly (e.g., in a counterclockwise direction 1442 as shown in FIG. 24) to separate the second magnetic subassembly 1304 from the first magnetic subassembly 1302 and reduce the overall force acting to prevent separation of the hand sprayer 1416 from the shower rail 1404. Once the magnetic force has been sufficiently reduced, the user may pull the hand sprayer 1416 away from the shower rail 1404 to reposition the hand sprayer 1416 within the shower enclosure.

Support System

Figures 26, 27, 28:
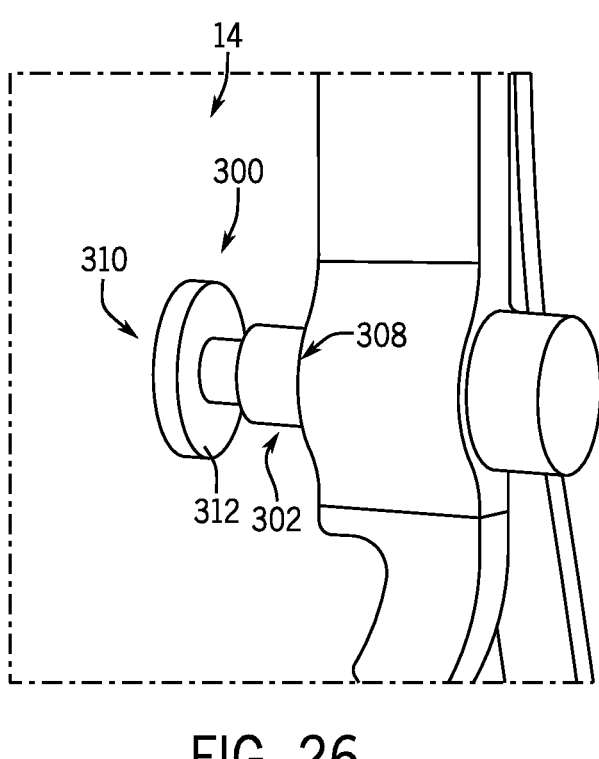
FIG. 26 is a perspective view of a support system for a shower column assembly, according to an exemplary embodiment.
FIG. 27 is a side sectional view of a microsuction pad and insert of the support system of FIG. 26, according to an exemplary embodiment.
FIG. 28 is a rear view of a portion of a microsuction pad of the support system of FIG. 26, according to an exemplary embodiment.

FIGS. 26-27 show a perspective and a side view, respectively, of a lower support system 300 for the assembly 100. The support system 300 includes the shower rail 104, a standoff 302, a retainer 304, and a microsuction pad 306. The support system 300 is configured to detachably couple the assembly 100 to a wall or another non-porous surface within the shower enclosure 10. As shown in FIG. 26, the standoff 302 extends away from the shower rail 104 in substantially perpendicular orientation relative to the shower rail 104 (e.g., radially outward relative to a central axis of the shower rail 104). A first end 308 of the standoff 302 is coupled to the shower rail 104 using bolts, screws, or another fastener. A second end 310 of the standoff 302 includes a generally cylindrically shaped flange 312. The flange 312 includes at least one planar surface (e.g., an axial end surface of the flange 312) that faces away from, and is oriented substantially parallel to, the wall. The standoff 302 may be made from a metal such as aluminum, stainless steel, or the like. In other embodiments, the standoff 302 may be made from a plastic material. In the exemplary embodiment of FIG. 26, the standoff 302 is made from the same material as the shower rail 104.

As shown in FIG. 27, a second end 310 of the standoff 302 is coupled to the microsuction pad 306 via retainer 304. The retainer 304 includes a mating member 316 that detachably couples (e.g., clips, hooks, etc.) the retainer 304 to the second end 310 of the standoff 302. Among other benefits, the retainer 304 may be easily replaced in the event that the microsuction pad 306 becomes damaged. The retainer 304 also simplifies assembly of the microsuction pad 306 to the shower rail 104 as compared to using an adhesive product. The retainer 304 may be made from a flexible or deformable material such as plastic, a thin metal, or the like.

The microsuction pad 306 includes a generally cylindrically-shaped micro-suction layer, shown as micro-suction layer 318. An outer diameter of the micro-suction layer 318 may be approximately equal to an outer diameter of the flange 312. The micro-suction layer 318 includes a plurality of microsuction elements 320. As shown in FIG. 27, a first surface 321 of the micro-suction layer 318 is coupled to the retainer 304 using glue, epoxy, or another suitable adhesive product. A second surface 322 of the micro-suction layer 318 is configured to detachably couple (e.g., removably couple) to the wall or another non-porous surface of the shower enclosure 10. As shown in FIG. 28, the microsuction elements 320 are formed as a plurality of shallow pockets or voids distributed along the second surface 322. The microsuction elements 320 are integrally formed with the micro-suction layer 318 as a single unitary structure. Each one of the plurality of microsuction elements 320 is configured to detachably (e.g., removably) couple the standoff 302 to a non-porous surface of the shower enclosure 10 (e.g., wall). The micro-suction layer 318 is sized to provide enough microsuction elements 320 to support the weight of the assembly 100.

The micro-suction layer 318 includes (e.g., is made substantially from) a material suited to withstand the conditions within the shower enclosure 10 (e.g., moisture, dampness, etc.). In the exemplary embodiment of FIG. 28, the micro-suction layer 318 is made from a polyether urethane material (e.g., foam), which, advantageously, provides excellent material stability in wet environments. In other embodiments, the micro-suction layer 318 may be made from a gel-like material.

Using a microsuction pad 306 to support the assembly 100 provides several benefits over other types of fasteners. Unlike bolts, screws, and other threaded fasteners, the microsuction pad 306 may be secured directly to the surface of the wall without drilling or otherwise forming holes into the wall. Additionally, because the holding force associated with a single microsuction element 320 is small relative to the force provided by a conventional suction cup, the microsuction pad 306 is much easier to detach from the wall (e.g., with the proper application of force along a perimeter or edge of the microsuction pad 306 to disengage only a few microsuction elements 320 from the wall, and then continuously peeling back the pad 306 from the perimeter or edge).

The shower column assembly, of which various exemplary embodiments are disclosed herein, provide several advantages over existing devices. The assembly includes a quick-connect system that minimizes installation complexity. The assembly additionally includes a magnetic docking system, which allows a user to quickly and easily dock a hand sprayer to a shower rail at any position along a length of the shower rail without having to slide or otherwise reposition a hand sprayer mounting bracket. Finally, the assembly is secured to a wall of the shower enclosure, in part, by a support system utilizing a microsuction pad, which allows a user to quickly and easily relocate the assembly or retrofit the assembly into an existing shower enclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIG-URES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

What is claimed is:

1. A quick-connect system for a plumbing fixture, comprising:
   an arm attachment;
   an intermediate fitting comprising a plurality of fingers, at least one finger of the plurality of fingers including a latch that extends radially outward from an outer surface of the at least one finger relative to a central axis of the intermediate fitting, at least one of the arm attachment and the intermediate fitting comprising a ball-joint configured to pivotably couple the plumbing fixture to a fluid conduit; and
   a collar defining an inner protrusion that projects radially inwardly toward a central axis of the collar, the collar configured to press the intermediate fitting against an end portion of the arm attachment when engaging the inner protrusion with the latch.

2. The quick-connect system of claim 1, wherein engagement between the inner protrusion and the latch substantially prevents movement of the collar with respect to the intermediate fitting.

3. The quick-connect system of claim 1, wherein the inner protrusion defines a ledge disposed along an inner surface of the collar adjacent to a proximal end of the collar.

4. The quick-connect system of claim 1, wherein the intermediate fitting comprises a cylindrical protrusion that defines a central opening sized to at least partially receive the end portion of the arm attachment therein.

5. The quick-connect system of claim 4, wherein the cylindrical protrusion defines a step extending radially inwardly at a base of the plurality of fingers.

6. The quick-connect system of claim 5, wherein the end portion of the arm attachment is a ball-joint, and wherein the step is configured to slidably engage with the ball-joint to allow the intermediate fitting to pivot at the ball-joint.

7. The quick-connect system of claim 5, wherein an inner diameter of the intermediate fitting at the step is less than an inner diameter of the intermediate fitting at the base of the fingers above the step.

8. The quick-connect system of claim 1, wherein the arm attachment comprises a quick-connect subassembly, comprising:
   a first portion;
   a second portion; and
   a retaining clip, the retaining clip engaged with the first portion and the second portion to detachably couple the first portion to the second portion.

9. The quick-connect system of claim 8, wherein the second portion includes an aperture extending radially therethrough, and wherein the retaining clip includes a locking tab extending through at least a portion of the aperture.

10. The quick-connect system of claim 1, wherein the arm attachment defines a fluid passage extending therethrough.

11. A quick-connect system for a plumbing fixture, comprising:
   an arm attachment;
   an intermediate fitting comprising a plurality of fingers, at least one finger of the plurality of fingers including a latch that extends radially outward from an outer surface of the at least one finger relative to a central axis of the intermediate fitting;
   a collar defining an inner protrusion that projects radially inwardly toward a central axis of the collar, the collar configured to press the intermediate fitting against an end portion of the arm attachment when engaging the inner protrusion with the latch; and
   a T-junction fitting coupled to the intermediate fitting downstream of the arm attachment and the intermediate fitting, the T-junction fitting including a first passage and a second passage spaced apart from the first passage and oriented parallel to the first passage, the intermediate fitting extending radially away from the first passage and the second passage.

12. The quick-connect system of claim 11, further comprising a diverter insert disposed at least partially within the T-junction fitting, the diverter insert configured to direct fluid from the intermediate fitting in two opposing directions.

13. A quick-connect system, comprising:
   an arm attachment;
   an intermediate fitting comprising:
      a plurality of fingers, at least one finger of the plurality of fingers including a latch that extends radially outward from an outer surface of the at least one finger relative to a central axis of the intermediate fitting; and
      a cylindrical protrusion defining a central opening sized to at least partially receive an end portion of the arm attachment therein, the cylindrical protrusion defining a step extending radially inwardly at a base of the plurality of fingers; and a collar defining an inner protrusion that projects radially inwardly toward a central axis of the collar, the collar configured to press the intermediate fitting against the end portion of the arm attachment when engaging the inner protrusion with the latch, wherein each one of the plurality of fingers is curved so that an inner diameter of the plurality of fingers at an outer end of the fingers is less than an inner diameter of the plurality of fingers at the step.

14. A quick-connect system for a plumbing fixture, comprising:

an arm attachment;

an intermediate fitting comprising a plurality of fingers, at least one finger of the plurality of fingers including a latch that extends radially outward from an outer surface of the at least one finger relative to a central axis of the intermediate fitting; and a collar defining an inner protrusion that projects radially inwardly toward a central axis of the collar, the collar configured to press the intermediate fitting against an end portion of the arm attachment when engaging the inner protrusion with the latch, the arm attachment comprising a quick-connect subassembly configured to detachably couple a first portion of the arm attachment to a second portion of the arm attachment.

\* \* \* \* \*